US007225323B2

(12) United States Patent
Siu et al.

(10) Patent No.: US 7,225,323 B2
(45) Date of Patent: May 29, 2007

(54) MULTI-PURPOSE FLOATING POINT AND INTEGER MULTIPLY-ADD FUNCTIONAL UNIT WITH MULTIPLICATION-COMPARISON TEST ADDITION AND EXPONENT PIPELINES

(75) Inventors: Ming Y. Siu, Sunnyvale, CA (US); Stuart F. Oberman, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 89 days.

(21) Appl. No.: 10/985,291

(22) Filed: Nov. 10, 2004

(65) Prior Publication Data

US 2006/0101242 A1    May 11, 2006

(51) Int. Cl.
*G06F 9/302*    (2006.01)
(52) U.S. Cl. .................... 712/222; 708/501; 708/523

(58) Field of Classification Search .................. None
See application file for complete search history.

(56) References Cited

U.S. PATENT DOCUMENTS

| 4,969,118 | A  | * | 11/1990 | Montoye et al. ............ 708/501 |
| 5,452,241 | A  | * | 9/1995  | Desrosiers et al. ......... 708/495 |
| 6,363,476 | B1 | * | 3/2002  | Ide ............................ 712/222 |
| 6,480,872 | B1 | * | 11/2002 | Choquette .................. 708/501 |
| 6,490,607 | B1 |   | 12/2002 | Oberman .................... 708/620 |
| 6,895,423 | B2 | * | 5/2005  | Kawata ...................... 708/501 |
| 6,912,557 | B1 | * | 6/2005  | North et al. ................ 708/490 |

* cited by examiner

*Primary Examiner*—Kenneth S. Kim
(74) *Attorney, Agent, or Firm*—Townsend and Townsend and Crew LLP

(57) ABSTRACT

A multipurpose functional unit is configurable to support a number of operations including multiply-add and comparison testing operations, as well as other integer and/or floating-point arithmetic operations, Boolean operations, and format conversion operations.

23 Claims, 9 Drawing Sheets

302 — FLOATING POINT OPERATIONS

| OP | INPUTS | RESULT |
|---|---|---|
| FADD | A,C | A+C |
| FMUL | A,B | A*B |
| FMAD | A,B,C | A*B+C |
| FCMP | A,B,C | C>=0? A:B |
| FMAX | A,B | A>=B? A:B |
| FMIN | A,B | A>=B? B:A |
| FSET | A,B | Boolean: A>B, A<B, A=B, A?B, etc. |

304 — INTEGER OPERATIONS

| OP | INPUTS | RESULT |
|---|---|---|
| IADD | A,C | A+C |
| IMUL | A,B | A*B |
| IMAD | A,B,C | A*B+C |
| ISAD | A,B,C | \|A−B\|+C |
| ICMP | A,B,C | C>=0? A:B |
| IMAX | A,B | A>=B? A:B |
| IMIN | A,B | A>=B? B:A |
| ISET | A,B | Boolean: A>B, A<B, A=B, A?B, etc. |

306 — BIT OPERATIONS

| OP | INPUTS | RESULT |
|---|---|---|
| LOP | A,B | 32-bit: A&B, A\|B, or A^B as appropriate |
| SHL | A,B | A shifted left by B bits |
| SHR | A,B | A shifted right by B bits. Shift can be arithmetic or logical. |

308 — FORMAT CONVERSION OPERATIONS

| OP | INPUTS | FORMATS SUPPORTED |
|---|---|---|
| F2F | A | fp16 to fp 32, fp32 to fp16 |
| F2I | A | fp23 or fp16 to u/s16 or u/s32 |
| I2F | A | u/s32 to fp32; u/s16 or u/s8 to fp32 or fp16 |
| I2I | A | any of u/s8, 16, 32 to any of u/s8, 16, 32 |
| FRC | A | fp32; result is fractional part of A in fp32 |

310 — FP32 ARGUMENT REDUCTION OPERATIONS

| OP | INPUTS | RESULT |
|---|---|---|
| RRO | A | for sin(A), map to interval [0, π/2] for ex2(A), A=ex2(N+f), extract f. Return result in special fixed-point format. |

MULTI-PURPOSE FLOATING POINT AND INTEGER MULTIPLY-ADD FUNCTIONAL UNIT WITH MULTIPLICATION-COMPARISON TEST ADDITION AND EXPONENT PIPELINES

CROSS-REFERENCES TO RELATED APPLICATIONS

The present disclosure is related to the following three commonly-assigned U.S. Patent Applications:

application Ser. No. 10/986,531 filed of even date herewith, entitled "Multipurpose Functional Unit with Combined Integer and Floating-Point Multiply-Add Pipeline";

application Ser. No. 10/985,695 filed of even date herewith, entitled "Multipurpose Functional Unit with Multiply-Add and Logical Test Pipeline"; and application Ser. No. 10/985,674 filed of even date herewith, entitled "Multipurpose Functional Unit with Multiply-Add and Format Conversion Pipeline."

The respective disclosures of these applications are incorporated herein by reference for all purposes.

BACKGROUND OF THE INVENTION

The present invention relates in general to microprocessors, and in particular to a multipurpose multiply-add functional unit for a processor core.

Real-time computer animation places extreme demands on processors. To meet these demands, dedicated graphics processing units typically implement a highly parallel architecture in which a number (e.g., 16) of cores operate in parallel, with each core including multiple (e.g., 8) parallel pipelines containing functional units for performing the operations supported by the processing unit. These operations generally include various integer and floating point arithmetic operations (add, multiply, etc.), bitwise logic operations, comparison operations, format conversion operations, and so on. The pipelines are generally of identical design so that any supported instruction can be processed by any pipeline; accordingly, each pipeline requires a complete set of functional units.

Conventionally, each functional unit has been specialized to handle only one or two operations. For example, the functional units might include an integer addition/subtraction unit, a floating point multiplication unit, one or more binary logic units, and one or more format conversion units for converting between integer and floating-point formats.

Over time, the number of elementary operations (instructions) that graphics processing units are expected to support has been increasing. New instructions such as a ternary "multiply-add" (MAD) instruction that computes A*B+C for operands A, B, and C have been proposed. Continuing to add functional units to support such operations leads to a number of problems. For example, because any new functional unit has to be added to each pipeline, the chip area required to add just additional unit can become significant. New functional units also increase power consumption, which may require improved cooling systems. Such factors contribute to the difficulty and cost of designing chips. In addition, to the extent that the number of functional units exceeds the number of instructions that can be issued in a cycle, processing capacity of the functional units is inefficiently used.

It would, therefore, be desirable to provide functional units that require reduced chip area and that can be used more efficiently.

BRIEF SUMMARY OF THE INVENTION

Embodiments of the present invention provide multipurpose functional units. In one embodiment, the multipurpose functional unit supports all of the following operations: addition, multiplication and multiply-add for integer and floating-point operands; test operations including Boolean operations, maximum and minimum operations, a ternary comparison operation and binary test operations (e.g., greater than, less than, equal to or unordered); left-shift and right-shift operations; format conversion operations for converting between integer and floating point formats, between one integer format and another, and between one floating point format and another; argument reduction operations for arguments of transcendental functions including exponential and trigonometric functions; and a fraction operation that returns the fractional portion of a floating-point operand. In other embodiments, the multipurpose functional unit may support any subset of these operations and/or other operations as well.

According to one aspect of the present invention, a multipurpose functional unit for a processor includes an input section, a multiplication pipeline, a test pipeline, an addition pipeline, an exponent pipeline, and an output section. The input section is configured to receive first, second, and third operands and an opcode designating one of a number of supported operations to be performed and is further configured to generate control signals in response to the opcode. The multiplication pipeline is coupled to the input section and is configurable in response to the control signals to compute a product of the first and second operands and to select the computed product as a first intermediate result. The test pipeline is coupled to the input section and is configurable in response to the control signals to perform a comparison on one or more of the first, second, and third operands and to select a result of the comparison as a second intermediate result. The addition pipeline is coupled to the multiplication section and the test pipeline and is configurable in response to the control signals to compute a sum of the first and second intermediate results and to select the computed sum as an operation result. The exponent pipeline is coupled to the input section and is configurable in response to the control signals to perform an exponent computation on one or more of the first, second, and third operands and to select a result of the exponent computation as an exponent result. The output section is coupled to receive the operation result and the exponent result and is configurable in response to the control signals to generate a final result for the one of the supported operations designated by the opcode. The supported operations include a floating-point multiply-add (FMAD) operation, an integer multiply-add (IMAD) operation, and at least one comparison test operation.

Various comparison test operations may be supported. For instance, in one embodiment, the at least one comparison test operation includes one or more operations selected from a group consisting of a maximum (MAX) operation, a minimum (MIN) operation, and a ternary comparison (CMP) operation. In another embodiment, the at least one comparison test operation includes one or more binary test (SET) operations selected from a group consisting of a greater than operation, a less than operation, an equality operation, and an unordered operation, wherein each of the one or more binary test operations produces a Boolean result. In embodiments where SET operations with a Boolean result are supported, an auxiliary result path may be coupled between the test pipeline and the output section and configured to deliver a Boolean auxiliary result from the test pipeline to the output section, and the output section may be further configurable in response to the control signals to generate the final result based on the Boolean auxiliary result in the event that the opcode designates one of the SET operations.

Other operations may also be supported. For instance, the supported operations may further include a bitwise Boolean logic operation (e.g., an AND operation, an OR operation, an XOR operation); a floating-point addition (FADD) operation and an integer addition (IADD) operation, with the addition pipeline being further configurable in response to the control signals to perform the FADD operation and the LADD operation; a floating-point multiplication (FMUL) operation and an integer multiplication (IMUL) operation, with the multiplication pipeline being further configurable in response to the control signals to perform the FMUL operation and the IMUL operation; a format conversion operation that converts the first operand from an input format to a target format; a domain mapping (RRO) operation, e.g., for trigonometric or exponential functions; and a fraction (FRC) operation that returns a fractional portion of the first operand. Various subcombinations of these operations, as well as other operations, may be supported.

According to another aspect of the present invention, a microprocessor includes an execution core having functional units configured to execute program operations. At least one of the functional units is a multipurpose functional unit capable of executing a number of supported operations including at least a floating-point multiply-add (FMAD) operation, an integer multiply-add (IMAD) operation, and at least one comparison test operation. The multipurpose functional unit includes an input section, a multiplication pipeline, a test pipeline, an addition pipeline, an exponent pipeline, and an output section. The input section is configured to receive first, second, and third operands and an opcode designating one of a number of supported operations to be performed and is further configured to generate control signals in response to the opcode. The multiplication pipeline is coupled to the input section and is configurable in response to the control signals to compute a product of the first and second operands and to select the computed product as a first intermediate result. The test pipeline is coupled to the input section and is configurable in response to the control signals to perform a comparison on one or more of the first, second, and third operands and to select a result of the comparison as a second intermediate result. The addition pipeline is coupled to the multiplication section and the test pipeline and is configurable in response to the control signals to compute a sum of the first and second intermediate results and to select the computed sum as an operation result. The exponent pipeline is coupled to the input section and is configurable in response to the control signals to perform an exponent computation on one or more of the first, second, and third operands and to select a result of the exponent computation as an exponent result. The output section is coupled to receive the operation result and the exponent result and is configurable in response to the control signals to generate a final result for the one of the supported operations designated by the opcode.

According to yet another aspect of the present invention, a method of operating a functional unit of a microprocessor is provided. An opcode and one or more operands are received; the opcode designates one of a plurality of supported operations to be performed on the one or more operands. In response to the opcode and the one or more operands, a multiplication pipeline in the functional unit is operated to generate a first intermediate result, a test pipeline in the functional unit is operated to generate a second intermediate result, and an exponent pipeline in the functional unit is operated to generate an exponent result and an alignment control signal. An addition pipeline in the functional unit is operated in response to the opcode and the alignment control signal to add the first and second intermediate results and generate an operation result. An output section of the functional unit is operated to compute a final result from the operation result and the exponent result. The supported operations include a floating-point multiply-add (FMAD) operation, an integer multiply-add (IMAD) operation, and at least one comparison test operation.

The following detailed description together with the accompanying drawings will provide a better understanding of the nature and advantages of the present invention.

BRIEF DESCRIPTION OF THE DRAWINGS

FIG. 3 is a listing of operations that can be performed in a multipurpose multiply-add (MMAD) unit according to an embodiment of the present invention;

DETAILED DESCRIPTION OF THE INVENTION

Embodiments of the present invention provide a high-speed multipurpose functional unit for any processing system capable of performing large numbers of high-speed computations, such as a graphics processor. In one embodiment, the functional unit supports a ternary multiply-add ("MAD") operation that computes A*B+C for input operands A, B, C in integer or floating-point formats via a pipeline that includes a multiplier tree and an adder circuit. Leveraging the hardware of the MAD pipeline, the functional unit also supports other integer and floating point arithmetic operations. The functional unit can be further extended to support a variety of comparison, format conversion, and bitwise operations with just a small amount of additional circuitry.

I. System Overview

A. Graphics Processor

Figure 1:
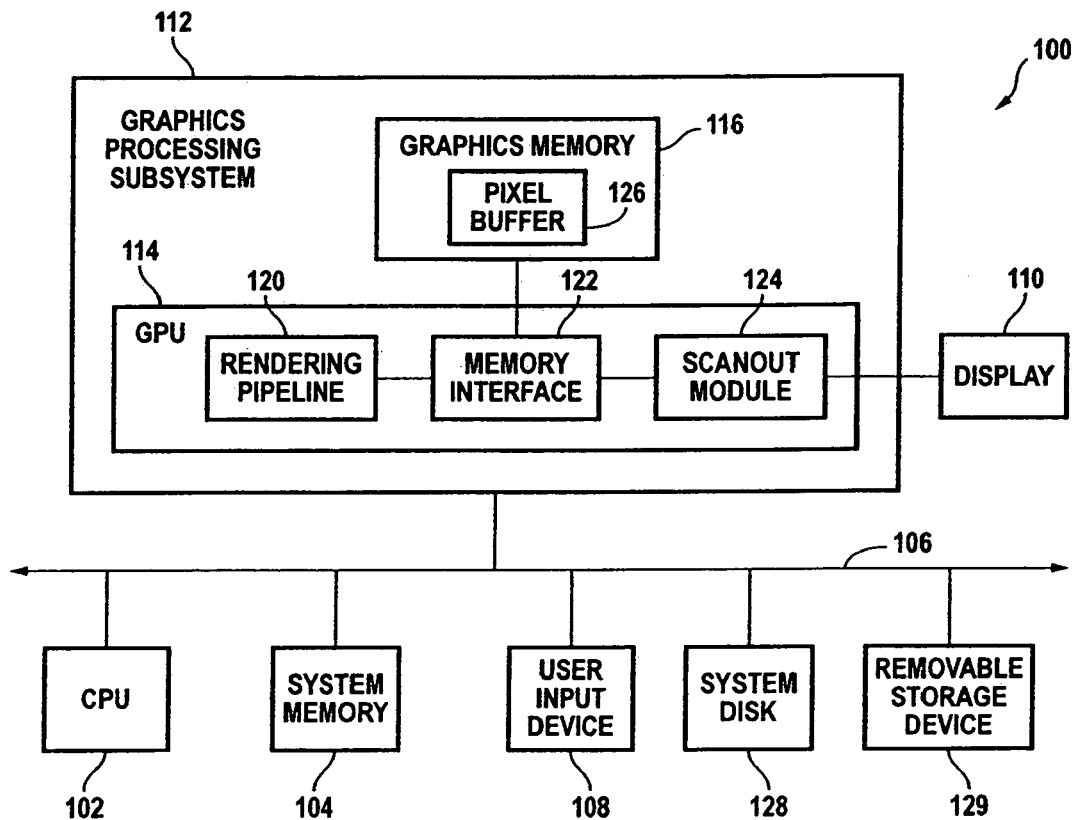
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 112 includes a graphics processing unit (GPU) 114 and a graphics memory 116, which may be implemented, e.g., using one or more integrated circuit devices such as programmable processors, application specific integrated circuits (ASICs), and memory devices. GPU 114 includes a rendering module 120, a memory interface module 122, and a scanout module 124. Rendering module 120 may be configured to perform various tasks related to generating pixel data from graphics data supplied via system bus 106 (e.g., implementing various 2D and or 3D rendering algorithms), interacting with graphics memory 116 to store and update pixel data, and the like. Rendering module 120 is advantageously configured to generate pixel data from 2-D or 3-D scene data provided by various programs executing on CPU 102. The particular configuration of rendering module 120 may be varied as desired, and a detailed description is omitted as not being critical to understanding the present invention.

Memory interface module 122, which communicates with rendering module 120 and scanout control logic 124, manages all interactions with graphics memory 116. Memory interface module 122 may also include pathways for writing pixel data received from system bus 106 to graphics memory 116 without processing by rendering module 120. The particular configuration of memory interface module 122 may be varied as desired, and a detailed description is omitted as not being critical to understanding the present invention.

Graphics memory 116, which may be implemented using one or more integrated circuit memory devices of generally conventional design, may contain various physical or logical subdivisions, such as a pixel buffer 126. Pixel buffer 126 stores pixel data for an image (or for a part of an image) that is read and processed by scanout control logic 124 and transmitted to display device 110 for display. This pixel data may be generated, e.g., from 2D or 3D scene data provided to rendering module 120 of GPU 114 via system bus 106 or generated by various processes executing on CPU 102 and provided to pixel buffer 126 via system bus 106.

Scanout module 124, which may be integrated in a single chip with GPU 114 or implemented in a separate chip, reads pixel color data from pixel buffer 118 and transfers the data to display device 110 to be displayed. In one embodiment, scanout module 124 operates isochronously, scanning out frames of pixel data at a prescribed refresh rate (e.g., 80 Hz) regardless of any other activity that may be occurring in GPU 114 or elsewhere in system 100. In some embodiments, the prescribed refresh rate can be a user selectable parameter, and the scanout order may be varied as appropriate to the display format (e.g., interlaced or progressive scan). Scanout module 124 may also perform other operations, such as adjusting color values for particular display hardware and/or generating composite screen images by combining the pixel data from pixel buffer 126 with data for a video or cursor overlay image or the like, which may be obtained, e.g., from graphics memory 116, system memory 104, or another data source (not shown). The particular configuration of scanout module 124 may be varied as desired, and a detailed description is omitted as not being critical to understanding the present invention.

During operation of system 100, CPU 102 executes various programs such as operating system programs, application programs, and driver programs for graphics processing subsystem 112. The driver programs may implement conventional application program interfaces (APIs) such as OpenGL, Microsoft DirectX or D3D that enable application and operating system programs to invoke various functions of graphics processing subsystem 112 as is known in the art. Operation of graphics processing subsystem 112 may be made asynchronous with other system operations through the use of appropriate command buffers.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, GPUs embodying the present invention may be incorporated into a variety of devices, including general purpose computer systems, video game consoles and other special purpose computer systems, DVD players, handheld devices such as mobile phones or personal digital assistants, and so on.

B. Execution Core

Figure 2:
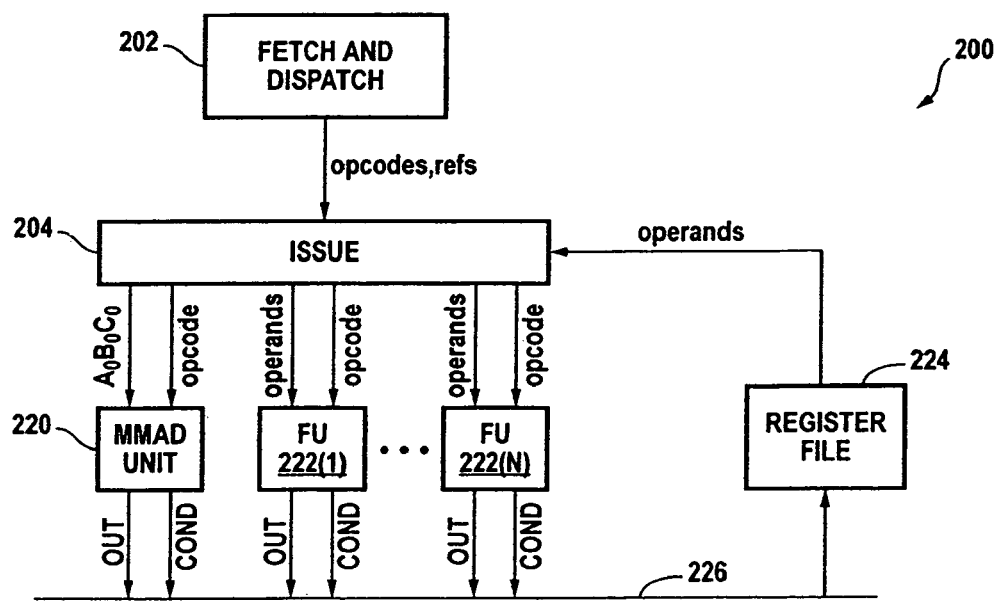
FIG. 2 is a block diagram of a portion of an execution core according to an embodiment of the present invention.

FIG. 2 is a block diagram of an execution core 200 according to an embodiment of the present invention. Execution core 200, which may be implemented, e.g., in a programmable shader for rendering module 120 of GPU 114 described above, is configured to execute arbitrary sequences of instructions for performing various computations. Execution core 200 includes a fetch and dispatch unit 202, an issue unit 204, a multipurpose multiply-add (MMAD) functional unit 220, a number (M) of other functional units (FU) 222, and a register file 224. Each functional unit 220, 222 is configured to perform specified operations. The operations performed by MMAD unit 220 are described below. The other functional units 222 may be of generally conventional design and may support a variety of operations such as transcendental function computations (e.g., sine and cosine, exponential and logarithm, etc.), reciprocation, texture filtering, memory access (e.g., load and store operations), integer or floating-point arithmetic, and so on.

During operation of execution core 200, fetch and dispatch unit 202 obtains instructions from an instruction store (not shown), decodes them, and dispatches them as opcodes with associated operand references or operand data to issue unit 204. For each instruction, issue unit 204 obtains any referenced operands, e.g., from register file 224. When all operands for an instruction are ready, issue unit 204 issues the instruction by sending the opcode and operands to MMAD unit 220 or another functional unit 222. Issue unit 204 advantageously uses the opcode to select the appropriate functional unit to execute a given instruction. Fetch and dispatch circuit 202 and issue circuit 204 may be implemented using conventional microprocessor architectures and techniques, and a detailed description is omitted as not being critical to understanding the present invention.

MMAD unit 220 and other functional units 222 receive the opcodes and associated operands and perform the specified operation on the operands. Result data is provided in the form of a result value (OUT) and a condition code (COND) that provides general information about the result value OUT, such as whether it is positive or negative or a special value (described below). In some embodiments, the condition code COND may also indicate whether errors or exceptions occurred during operation of the functional unit. The result data is forwarded to register file 224 (or another destination) via a data transfer path 226.

It will be appreciated that the execution core of FIG. 2 is illustrative and that variations and modifications are possible. Fetch and dispatch unit 202 and issue unit 204 may implement any desired microarchitecture, including scalar or superscalar architectures with in-order or out-of-order instruction issue, speculative execution modes, and so on as desired. In some architectures, the issuer may issue a long instruction word that includes opcodes and/or operands for multiple functional units. The execution core may also include a sequence of pipelined functional units in which results from functional units in one stage are forwarded to functional units in later stages rather than directly to a register file; the functional units can be controlled by a single long instruction word or separate instructions. Persons of ordinary skill in the art with access to the present teachings will recognize that MMAD unit 220 can be implemented as a functional unit in any microprocessor, not limited to graphics processors or to any particular processor or execution core architecture.

C. MMAD Unit

In accordance with an embodiment of the present invention, execution core 200 includes an MMAD unit 220 that supports numerous integer and floating-point operations on up to three operands (denoted herein as A, B, and C). In one embodiment, MMAD unit 220 implements a multiply-add (MAD) pipeline for computing A*B+C for integer or floating-point operands, and various circuits within this pipeline are leveraged to perform numerous other integer and floating-point operations. Operation of MMAD unit 220 is controlled by issue circuit 204, which supplies operands and opcodes to MMAD unit 220 as described above. The opcodes supplied with each set of operands by issue circuit 204 control the behavior of MMAD unit 220, selectively enabling one of its operations to be performed on that set of operands.

MMAD unit 220 is advantageously designed to handle operands in a variety of formats, including both integer and floating-point formats. In embodiments described herein, MMAD unit 220 handles two floating-point formats (referred to herein as fp32 and fp16) and six integer formats (referred to herein as u8, u16, u32, s8, s16, s32). These formats will now be described.

"Fp32" refers to the standard IEEE 754 single precision floating-point format in which a normal floating point number is represented by a sign bit, eight exponent bits, and 23 significand bits. The exponent is biased upward by 127 so that exponents in the range $2^{-126}$ to $2^{127}$ are represented using integers from 1 to 254. For "normal" numbers, the 23 significand bits are interpreted as the fractional portion of a 24-bit mantissa with an implied 1 as the integer portion. Numbers with all zeroes in the exponent bits are referred to as denorms and are interpreted as not having an implied leading 1 in the mantissa; such numbers may represent, e.g., an underflow in a computation. The (positive or negative) number with all ones in the exponent bits and zeroes in the significand bits are referred to as (positive or negative) INF; this number may represent, e.g., an overflow in a computation. Numbers with all ones in the exponent bits and a non-zero number in the significand bits are referred to as Not a Number (NaN) and may be used, e.g., to represent a value that is undefined. Zero is also considered a special number and is represented by all of the exponent and significand bits being set to zero.

"Fp16" refers to a half-precision format that is often used in graphics processing. The fp16 format is similar to fp32, except that fp16 has 5 exponent bits and 10 significand bits. The exponent is biased upward by 15, and the significand for normal numbers is interpreted as the fractional portion of an 11-bit mantissa with an implied "1" as the integer portion. Special numbers, including denorms, INF, NaN, and zero are defined analogously to fp32.

Integer formats are specified herein by an initial "s" or "u" indicating whether the format is signed or unsigned and a number denoting the total number of bits (e.g., 8, 16, 32); thus, s32 refers to signed 32-bit integers, u8 to unsigned eight-bit integers and so on. For the signed formats, twos complement negation is advantageously used. Thus, the range for u8 is [0, 15] while the range for s8 is [−8, 7]. In all formats used herein, the most significant bit (MSB) is at the left of the bit field and the least significant bit (LSB) is at the right.

It is to be understood that specific formats are defined and referred to herein for purposes of illustration and that an NMAD unit might support any combination of these formats or different formats.

In addition to handling different operand formats, MMAD unit 220 is advantageously configured to support a number of different operations. For example, FIG. 3 is a listing of types of operations that can be performed by an embodiment of MMAD unit 220 described herein. Floating point arithmetic operations (listed at 302) can be performed on operands in fp32 or fp16 formats, with results returned in the input format. In some embodiments, floating point arithmetic is supported in only one format, e.g., fp32. Along with addition (FADD), multiplication (FMUL), and multiply-add (FMAD) operations, various operand comparison operations are supported. These include a ternary conditional selection operation (FCMP) that selects A if C is greater than or equal to zero and B otherwise, as well as a maximum operation (FMAX) that returns the larger of operands A and B, and a minimum operation (FMIN) that returns the smaller of the two. The binary test operation (FSET) performs one of a number of binary relationship tests on operands A and B and returns a Boolean value indicating whether the test is satisfied. In this embodiment, the binary relationships that can be tested include greater than (A>B), less than (A<B), equal to (A=B), and unordered (A?B, which is true if either A or B is NaN), as well as negations (e.g., A≠B), and various combination tests (such as A≧B, A<>B, A?=B, and so on).

Integer arithmetic operations (listed at 304) can be performed on operands in any integer format, with results returned in the input format. The supported integer arithmetic operations include addition (IADD), multiplication (IMUL), multiply-add (IMAD), conditional selection (ICMP), maximum (IMAX), minimum (IMIN), and binary tests (ISET), all of which are defined similarly to their floating point counterparts. Also supported is a sum of absolute difference (ISAD) operation that computes |A−B|+ C.

Bit operations (listed at 306) treat the operands as 32-bit fields. Logical operations (LOPs) include the binary Boolean operations AND (A&B), OR (A|B) and XOR (A^B). The result of a LOP is a 32-bit field indicating the result of performing the operation on corresponding bits of operands A and B. Left shift (SHL) and right shift (SHR) operations are also supported, with operand A being used to supply the bit field to be shifted and operand B being used to specify the shift amount. Right shifts can be logical (with zero inserted into the new MSB positions) or arithmetic (with the sign bit extended to the new MSB positions).

Format conversion operations (listed at 308) convert operand A from one format to another. "F2F" refers generally to conversion from one floating point format to another. In some embodiments, these conversions can also include scaling the operand by $2^N$ for an integer N. In addition, F2F conversions with integer rounding are also supported. "F2I" refers to conversion from floating point formats to integer formats. As with F2F conversions, the operand can be scaled by $2^N$. "I2F" refers generally to integer-to-floating-point conversions; such operations can be combined with negation or absolute value operations, as well as $2^N$ scaling. "I2I" refers to conversion from one integer format to another; these conversions can also be combined with absolute value or negation operations. "FRC" is a "fraction" operation that returns the fractional portion of a floating-point input operand.

The fp32 argument reduction operation (listed at 310), also referred to as a range reduction operation (RRO), is used to constrain an argument x of a transcendental function (such as sin(x), cos(x), or $2^x$) to a convenient numerical interval so that the transcendental function can be computed by a suitably configured functional unit (which may be, e.g., one of functional units 222 in FIG. 2). In this embodiment, before a transcendental function instruction is issued to a functional unit, its argument is provided as operand A to MMAD unit 220. For sine and cosine functions, operand A is mapped into the interval [0, 2π); for the exponential function (also denoted EX2), operand A is represented as a number N+f, where N is an integer and f is in the interval [0, 1). As is known in the art, such argument reduction can simplify the design of functional units for transcendental functions by limiting the set of possible arguments to a bounded range.

Sections II and III describe a MMAD unit 220 that can perform all of the operations shown in FIG. 3. Section II describes a circuit structure for MMAD unit 220, and Section III describes how that circuit structure can be used to execute the operations listed in FIG. 3. It is to be understood that the MMAD unit 220 described herein is illustrative and that other or different combinations of functions might be supported using appropriate combinations of circuit blocks.

II. Example MMAD Unit Structure

Figure 4:
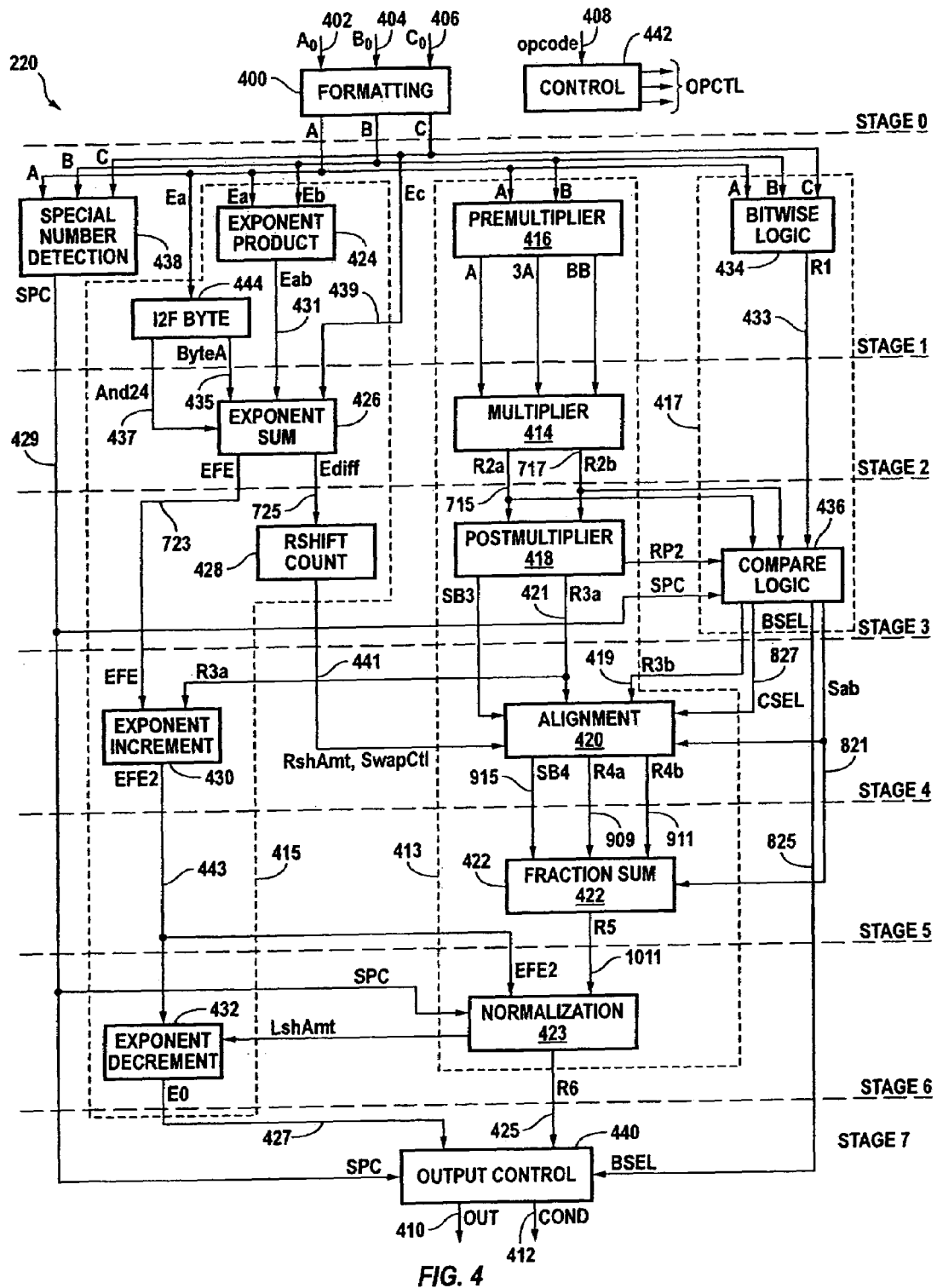
FIG. 4 is a block diagram of an MMAD unit according to an embodiment of the present invention.

FIG. 4 is a simplified block diagram of an MMAD unit 220 according to an embodiment of the present invention that supports all operations shown in FIG. 3. In this embodiment, MMAD unit 220 implements an eight-stage pipeline that is used for all operations. On each processor cycle, MMAD unit 220 can receive (e.g., from issue circuit 204 of FIG. 2) three new operands ($A_0$, $B_0$, $C_0$) via operand input paths 402, 404, 406 and an opcode indicating the operation to be performed via opcode path 408. In this embodiment, the operation may be any operation shown in FIG. 3. In addition to the operation, the opcode advantageously indicates the input format for the operands (and also the output format to use for the result, which might or might not be same as the input format. It should be noted that an operation shown in FIG. 3 may have multiple opcodes associated with it; e.g., there may be one opcode for FMUL with fp32 operands and a different opcode for FMUL with fp16 operands, etc.

MMAD unit 220 processes each operation through all of the pipeline stages 0–7 and produces a 32-bit result value (OUT) on signal path 410 and a corresponding condition code (COND) on signal path 412. These signals may be propagated, e.g., to register file 224 as shown in FIG. 2 or to other elements of a processor core, depending on the architecture. In one embodiment, each stage corresponds to a processor cycle; in other embodiments, elements shown in one stage may be split across multiple processor cycles or elements from two (or more) stages may be combined into one processor cycle. One implementation was ten stages (cycles) at 1.5 GHz.

Section II.A provides an overview of the MMAD pipeline, and Sections II.B-I describe the circuit blocks of each stage in detail.

A. MMAD Pipeline

An initial understanding of the pipeline can be had with reference to how the circuit blocks of stages 0–2 are used during an FMAD operation. Stage 0 is an operand formatting stage that may optionally be implemented in issue unit 204 or in MMAD unit 220 to align and represent operands (which may have fewer than 32 bits) in a consistent manner. Stages 1–3 perform the multiplication (A*B=P) portion of the FMAD operation, while stages 4–6 perform the addition (P+C) portion. In stage 7, the final result is formatted for distribution on signal paths 410, 412. Stage 7 also includes control logic for generating special outputs in the event of special number inputs, overflows, underflows or other conditions as described below.

To facilitate the present description, three primary internal data paths for MMAD 25 unit 220 are indicated by dotted boundaries in FIG. 4 and are referred to herein as a "mantissa path" 413, an "exponent path" 415, and a "test path" 417. While these names suggest functions performed during certain operations (e.g., FMAD or comparisons) by the various circuit blocks shown on each path, it will become apparent that circuit blocks along any of internal data paths 413, 415, 417 may be leveraged for a variety of uses in an operation-dependent manner.

Along mantissa path 413, stages 1–3 include circuit blocks that multiply the mantissas of floating-point operands A and B. Multiplier block 414 in stage 2 is supported by a pre-multiplier block 416 and a post-multiplier block 418. The multiplication result is provided as a result R3a on a path 421 at the end of stage 3. Stages 4–6 include an alignment block 420 and a fraction sum block 422 that align and add the result R3a with the mantissa of floating-point operand C, which is provided via test path 417 as a result R3b on a path 419. The final mantissa is normalized in a normalization block 423 and provided as a result R6 on a path 425 at the output of stage 6.

Exponent path 415 performs appropriate operations on exponent portions (denoted Ea, Eb, Ec) of floating-point operands A, B, and C to support the FMAD operation. Exponent product block 424 in stage 1 computes an exponent for the product A*B, e.g., by adding Ea and Eb and subtracting the bias (e.g., 127), while exponent sum block 426 in stage 2 determines an effective final exponent (EFE) for the sum (A*B)+C and an exponent difference (Ediff) that is used to control operation of alignment block 420 in stage 4. Subsequent circuit blocks along exponent path 415, including an Rshift count block 428 at stage 3, an exponent increment block 430 at stage 4, and an exponent decrement block 432 at stage 6, adjust the exponent EFE based on properties of the mantissa results, providing the final exponent E0 on a path 427.

The circuit blocks of test path 417 are used primarily for operations other than FMAD, notably integer and floating-point comparison operations. Test path 417 includes a bitwise logic block 434 at stage 1 and a compare logic block 436 at stage 3; operations of these elements are described below. During an FMAD operation, test path 412 propagates the mantissa of operand C to path 419 at the output of stage 3.

In parallel with the primary data paths, MMAD unit 220 also handles special numbers (e.g., NaN, INF, denorm and zero in the case of fp32 or fp16 operands) via a special number detection circuit 438 at stage 1 that generates a special number signal (SPC) on a path 429. Special number detection circuit 438, which receives all three operands A, B, and C, may be of generally conventional design, and the special number signal SPC may include several (e.g., 3) bits per operand to indicate the special number status of each operand via a predefined special number code. The special number signal SPC may be provided to various downstream circuit blocks, including an output control block 440 of stage 7 that uses the special number signal SPC to override results from the pipeline (e.g., R6 and E0) with special values when appropriate; examples are described below.

At the end of the pipeline, output control block 420 provides the result OUT on signal path 410 and a condition code COND on signal path 412. The condition code, which advantageously includes fewer bits than the result, carries general information about the nature of the result. For example, the condition code may include bits indicating whether the result is positive, negative, zero, NaN, INF, denorm, and so on. As is known in the art, where a condition code is provided with a result, subsequent consumers of that result can sometimes use the condition code rather than the result itself in their processing. In some embodiments, the condition code may be used to indicate the occurrence of an exception or other event during execution of the operation. In other embodiments, the condition code may be omitted entirely.

In addition to the data paths, MMAD unit 220 also provides a control path, represented in FIG. 4 by a control block 442 in stage 0. Control block 442 receives the opcode and generates various opcode-dependent control signals, denoted generally herein as "OPCTL," that can be propagated to each circuit block in synchronization with data propagation through the pipeline. (The connection of OPCTL signals into the various circuit blocks is not shown in FIG. 4.) As described below, OPCTL signals can be used to enable, disable, and otherwise control the operation of various circuit blocks of MMAD unit 220 in response to the opcode so that different operations can be performed using the same pipeline elements. The various OPCTL signals referred to herein can include the opcode itself or some other signal derived from the opcode, e.g., by combinatorial logic implemented in control block 442. In some embodiments, control block 442 may be implemented using multiple circuit blocks in several pipeline stages. It is to be understood that the OPCTL signals provided to different blocks during a given operation may be the same signal or different signals. In view of the present disclosure, persons of ordinary skill in the art will be able to construct suitable OPCTL signals.

It should noted that the circuit blocks for a given stage may require different amounts of processing time and that the time required at a particular stage might vary from one operation to another. Accordingly, MMAD unit 220 may also include various timing and synchronization circuits (not shown in FIG. 4) to control propagation of data on different paths from one pipeline stage to the next. Any appropriate timing circuitry (e.g., latches, transmission gates, etc.) may be used.

B. Elements in Stage 0

In this embodiment, 8-bit (16-bit) integer operands are delivered to MMAD unit 220 as the eight (16) LSBs of a 32-bit operand, and fp16 operands are delivered in a "padded" format with three extra bits (all zero) inserted to the left of the five exponent bits and 13 extra bits (all zero) inserted to the right of the ten fraction bits. During stage 0, a formatting block 400 advantageously performs further formatting on the received operands for certain operations.

Figure 5:
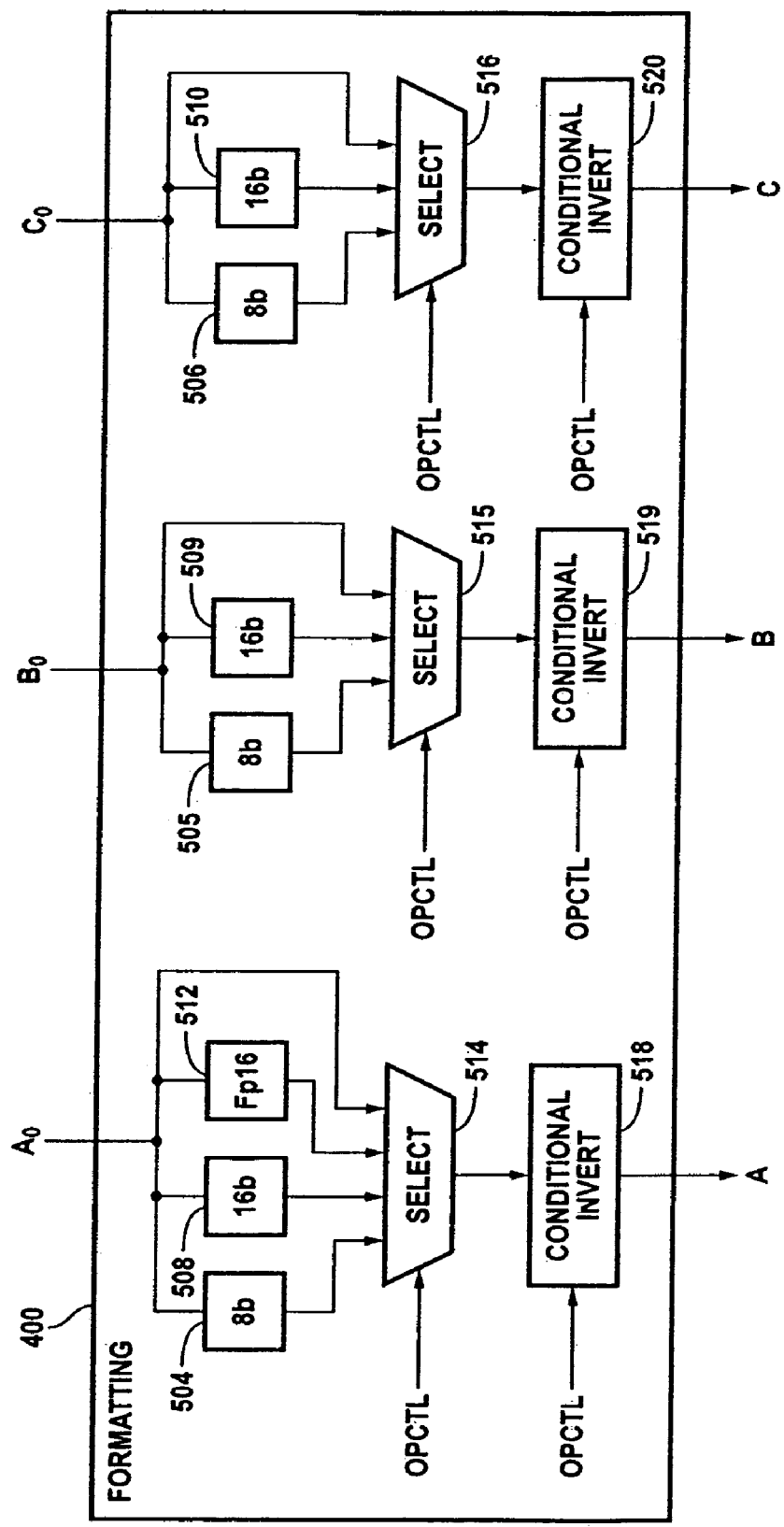
FIG. 5 is a block diagram of an operand formatting block for the MMAD unit of FIG. 4.

FIG. 5 is a block diagram showing components of formatting block 400. Each received operand $A_0$, $B_0$, $C_0$ passes down multiple paths in parallel, with different conversions being applied on each path. Eight-bit up-converters 504, 505, 506 convert 8-bit integers to 32-bit integers by sign extending the most significant bit (MSB). Similarly, 16-bit up-converters 508, 509, 510 convert 16-bit integers to 32-bit integers by sign extending. For operand A, an fp16 up-converter block 512 promotes an fp16 operand to fp32 by adjusting the exponent bias from 15 to 127.

Selection multiplexers (muxes) 514, 515, 516 select the correct input format for each operand based on an OPCTL signal that corresponds to the operand format (which is specified by the opcode as noted above). After muxes 514–516, each operand path also includes a conditional inverter circuit 518, 519, 520 that can be used to generate the ones complement of the operand by flipping all the bits. Conditional inverter circuits 518–520 are controlled by an OPCTL signal and sign bits of the operands. Specific cases where inversion might be performed are described below.

In some embodiments, for fp16 and fp32 operands, a 33-bit representation is used internally. In this representation, the implicit leading 1 is prepended to the significand bits so that 24 (11) mantissa bits are propagated for fp32 (fp16). In other embodiments, integer operands in formats with fewer than 32 bits may be aligned arbitrarily within the 32-bit field, and formatting block 400 may shift such operands to the LSBs of the internal 32-bit data path. Similarly, fp16 operands may be delivered without padding, and formatting block 400 may insert padding as described above or perform other alignment operations.

C. Elements in Stage 1

Referring again to FIG. 4, formatting block 400 provides operands A, B, and C to the various data paths of stage 1. Stage 1 includes a premultiplier block 416 in mantissa path 413, an exponent product block 424 in exponent path 415, and a bitwise logic block 434 in test path 417, as well as special number detection block 438 as described above.

Figure 6A:
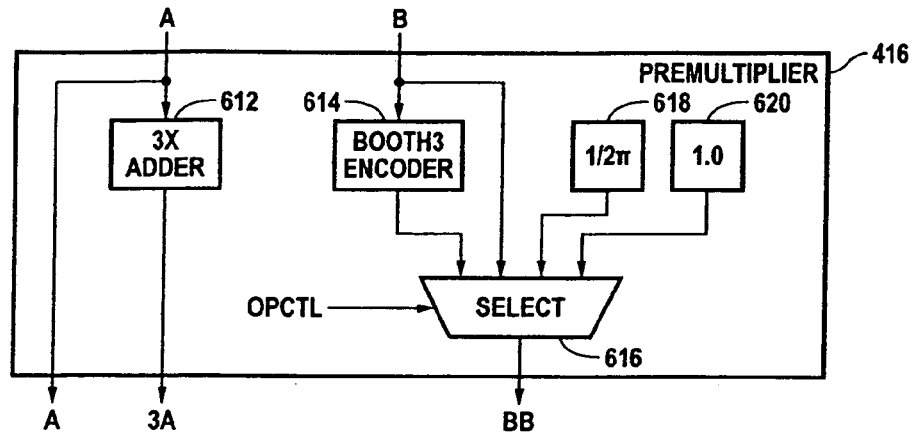
FIG. 6A is a block diagram of a premultiplier block for the MMAD unit of FIG. 4.

FIG. 6A is a block diagram of premultiplier block 416. Premultiplier block 416 prepares a multiplicand (operand A) and a multiplier (operand B) for multiplication using the Booth 3 algorithm; the actual multiplication is implemented in multiplier block 414 of stage 2. In the case of integer operands A and B, premultiplier block 416 operates on the entire operand; in the case of floating-point operands, premultiplier block 416 operates on the mantissa portion including the implicit or explicit leading "1". Thus, where the present description refers to an operand, it is to be understood that the entire operand or just the mantissa portion may be used as appropriate.

As shown in FIG. 6A premultiplier block 416 includes a "3X" adder 612, a Booth3 encoder 614, and a selection multiplier (mux) 616. The 3X adder 612, which may be of generally conventional design, receives operand A (the multiplicand) and computes 3A (e.g., by adding A+2A) for use by multiplier block 414. Operand A and the computed 3A are forwarded to stage 2. Booth3 encoder 614, which may be of generally conventional design, receives operand B (the multiplier) and performs conventional Booth3 encoding, generating overlapping 4-bit segments from the bits of operand B. In other embodiments, multiplication algorithms other than Booth3 may be used, and any appropriate premultiplier circuitry may be substituted for the particular circuits described herein.

Selection mux 616 is controlled by an OPCTL signal to select among operand B, the Booth3 encoded version of operand B, and constant multipliers (e.g., $\frac{1}{2}\pi$ and 1.0) that are stored in Booth3 encoded form in registers 618, 620. The selected value is provided as a result BB to stage 2. For an FMUL or IMUL operation, the Booth3 encoded version of operand B is selected. During other operations, selection mux 616 can be controlled to bypass operand B around Booth3 encoder 614 (e.g., for comparison operations as described below) or to select in one of the constant multipliers from registers 618,620 (e.g., for argument reduction or format conversion operations as described below). In other embodiments, for operations where a constant multiplier is used, the multiplier can be supplied as operand $B_0$ at the input of MMAD unit 220, or a non-Booth-encoded representation of the multiplier might be selected in at the input of premultiplier block 416, then Booth encoded using encoder 614.

Figure 6B:
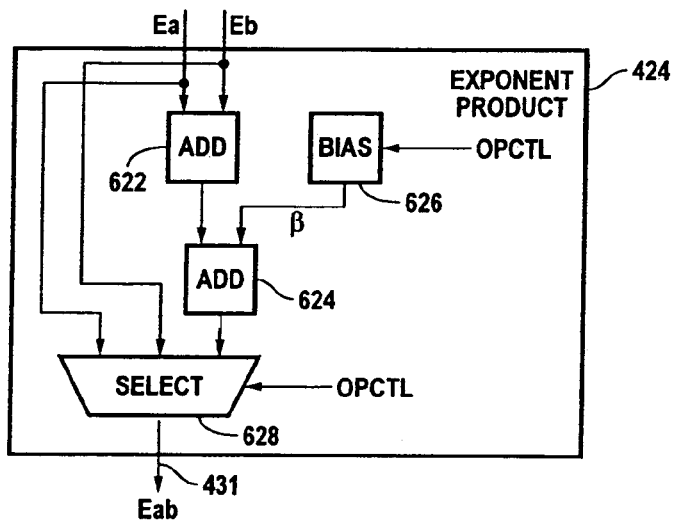
FIG. 6B is a block diagram of an exponent product block for the MMAD unit of FIG. 4.

FIG. 6B is a block diagram showing exponent product block 424. For floating point arithmetic operations, exponent product block 424 receives the exponent bits (Ea, Eb) for operands A and B and adds them in a first adder circuit 622 to compute the exponent for the product A*B. Exponent product block 424 also includes a second adder circuit 624 that adds a bias β (which may be positive, negative, or zero) to the sum Ea+Eb. A bias register 626 stores one or more candidate bias values, and an OPCTL signal is used to select the appropriate bias in an operation-dependent manner. For example, during FMUL operations, the bias β may be used to correct the fp16 or fp32 exponent bias when two biased exponents Ea and Eb are added. During other operations, different values may be selected for bias β as described below. At the output of exponent product block 424, a selection mux 628 selects among the sum and the two input exponents in response to an OPCTL signal. The result Eab is propagated to stage 2 on a path 431.

Result Eab is advantageously represented using one more bit than the input exponents Ea, Eb, allowing exponent saturation (overflow) to be detected downstream. For instance, if the exponents Ea and Eb are each eight bits, Eab may be nine bits.

Figure 6C:
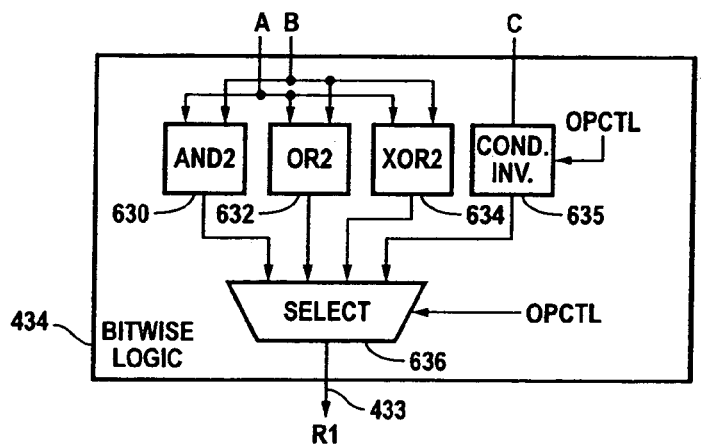
FIG. 6C is a block diagram of a bitwise logic block for the MMAD unit of FIG. 4.

FIG. 6C is a block diagram showing bitwise logic block 434. Operands A and B are supplied to an AND2 circuit 630, an OR2 circuit 632, and an XOR2 circuit 634. Each of these circuits, which may be of generally conventional design, performs the designated logical operation on corresponding bits of operands A and B, providing a 32-bit candidate result. In parallel, a conditional inverter 635 is operated to invert operand C during a FRC operation and to pass operand C through unaltered during other operations. Selection mux 636 selects one of the results of the various logical operations or operand C (or its inverse) in response to an OPCTL signal, with the selected data (R1) being propagated through stage 2 on a path 433. The OPCTL signal for selection mux 636 is configured such that operand C will be selected for a MAD, ADD or CMP operation; the appropriate one of the logical operation results will be selected for logical operations; and the result from XOR2 circuit 634 will be propagated for SET operations. For some operations, result R1 is not used in downstream components; in such instances, any selection may be made.

Stage 1 also includes an "I2F byte" circuit 444, as shown in FIG. 4. This circuit, which is used during I2F format conversion operations, selects as ByteA the eight MSBs of operand A and propagates ByteA to stage 2 via a path 435. I2F byte circuit 444 also includes an AND tree (not shown) that determines whether all of the 24 LSBs of operand A are 1. The AND tree output signal (And24) on path 437 may be a single bit that is set to 1 if all 24 LSBs of operand A are 1 and to 0 otherwise.

D. Elements in Stage 2

Referring again to FIG. 4, stage 2 includes multiplier block 414 on mantissa path 413 and exponent sum block 426 on exponent path 415. On test path 417, path 433 propagates data R1 through to stage 3 without further processing.

Figure 7A:
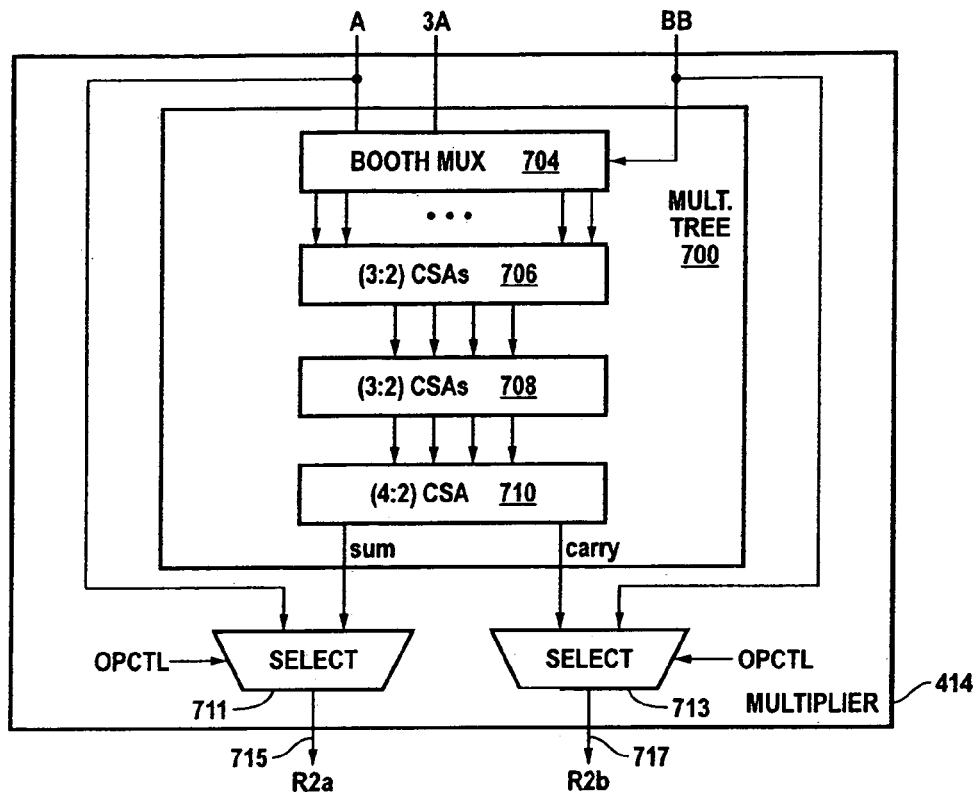
FIG. 7A is a block diagram of a multiplier block for the MMAD unit of FIG. 4.

FIG. 7A is a block diagram of multiplier block 414, which includes a multiplier tree 700. In multiplier tree 700, a Booth multiplexer 704 receives operand A, the computed result 3A, and the Booth3 encoded operand BB from stage 1 and implements a Booth multiplication algorithm. As is known in the art, Booth multiplication involves selecting a partial product (which will be a multiple of the multiplicand A) corresponding to each bit group in the Booth3 encoded multiplier BB. The resulting partial products are added using a carry-save adder (CSA) tree that, in this embodiment, consists of three (3:2) CSAs 706 that feed two (3:2) CSAs 708, which in turn feed one (4:2) 39-bit CSA 710. Booth multiplexer 704 and CSAs 706, 708, 710 may be of generally conventional design. The final output is the product A*B in a redundant (sum, carry) representation. The sum and carry fields are advantageously wider than the operands (e.g., 48 bits each in one embodiment). Other multiplier circuits, including circuits implementing algorithms other than Booth multiplication, may be substituted.

In one embodiment, the multiplier supports up to 24-bit times 24-bit multiplications. Products of larger operands (e.g., 32-bit integers) can be synthesized using multiple multiplication operations (e.g., multiple 16-bit times 16-bit multiplication operations) as is known in the art. In other embodiments, the multiplier may have a different size and may support, e.g., up to 32-bit time, 32-bit multiplication. Such design choices are not critical to the present invention and may be based on considerations such as chip area and performance.

Multiplier block 414 also includes bypass paths for operands A and B. Specifically, a selection mux 711 receives operand A and the sum field from multiplier tree 700 while another selection mux 713 receives operand B and the carry field from multiplier tree 410. Muxes 711, 713 are controlled by a common OPCTL signal so that either the operands (A, B) or the multiplication result (sum, carry) are selected as results R2a and R2b and propagated onto paths 715, 717. For multiplication or MAD operations, sum and carry results would be selected. For other operations, e.g., ISAD or maximum or minimum, operands A and B would be selected as described below. It should be noted that result paths 715, 717 are advantageously made wider than normal operands (e.g., 48 bits as opposed to 32 bits); accordingly, operands A and B can be padded with leading or trailing zeroes as desired when they are selected by muxes 711, 713.

Figure 7B:
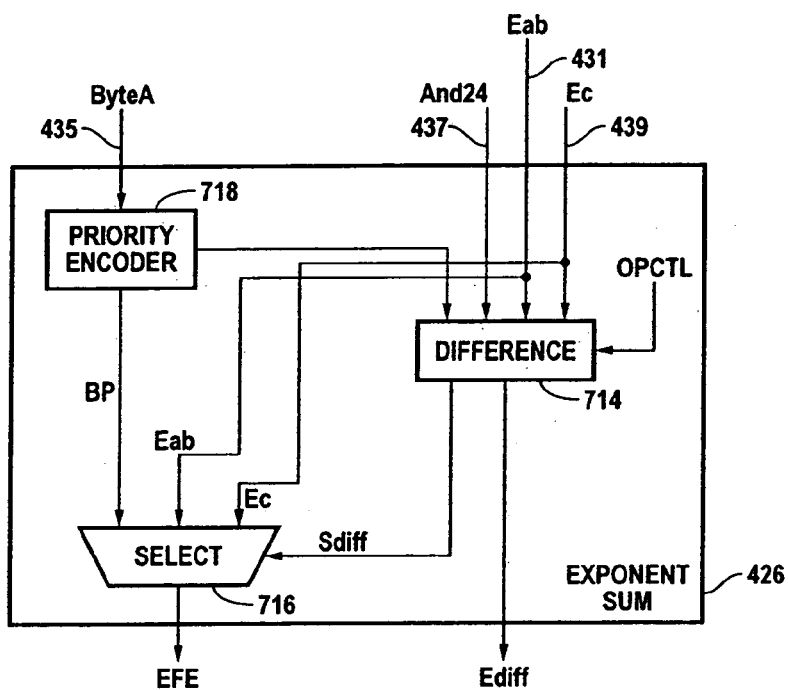
FIG. 7B is a block diagram of an exponent sum block for the MMAD unit of FIG. 4.

FIG. 7B is a block diagram of exponent sum block 702, which includes a difference circuit 714, a selection mux 716 and an eight-bit priority encoder 718. Difference circuit 714 receives the product exponent Eab on path 431 and the exponent portion (Ec) of operand C on path 439 and computes the difference (Eab−Ec). During floating-point addition or MAD operations, difference circuit 714 provides a signal Sdiff representing the sign of the difference on path 721. This signal is used to control selection mux 716 to select the larger of Eab and Ec as an effective final exponent (EFE) for the sum (A*B)+C. Signal EFE is propagated downstream on a path 723. The difference (Ediff) itself, which may be positive or negative, is propagated to downstream components on a path 725. For operations other than floating-point addition or MAD, exponent sum block 702 can be leveraged for other purposes; accordingly difference circuit 714 receives an OPCTL signal that controls generation of the signals Sdiff and Ediff as described below.

Priority encoder 718 is used during I2F conversion operations to identify the position of a leading 1 (if any) among the eight MSBs of operand A. The MSBs (signal ByteA) are provided to priority encoder 718 via path 435, and the priority encoder output BP represents an exponent derived from the bit position of the leading 1 (if all eight MSBs are zero, the output BP may be zero). During I2F conversion operations, difference circuit 714 also uses the signal And24 during output selection as described below.

E. Elements in Stage 3

Stage 3 includes post-multiplier block 418 on mantissa path 413, Rshift count circuit 428 on exponent path 415, and compare logic 436 on test path 417.

Figure 8A:
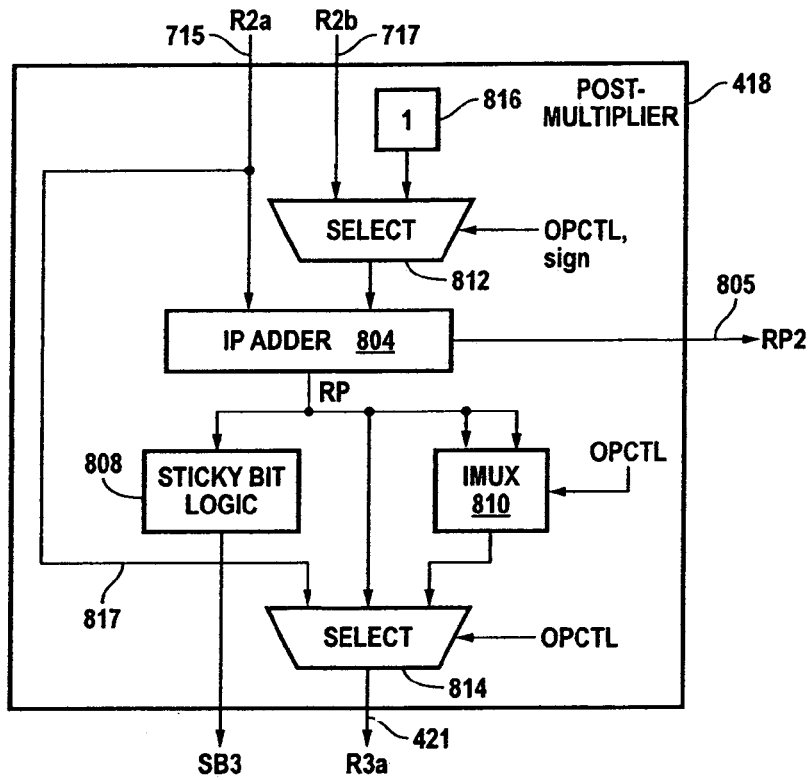
FIG. 8A is a block diagram of a postmultiplier block for the MMAD unit of FIG. 4.

FIG. 8A is a block diagram of post-multiplier block 418, which includes an intermediate product (IP) adder 804, sticky bit logic 808, an integer mux 810, an input selection mux 812, and an output selection mux 814. In response to an OPCTL signal, input selection mux 812 selects between the result R2b on path 717 (from multiplier block 414 of stage 2) and a constant operand (value 1) stored in a register 816. As described below, the OPCTL signal for mux 812 selects the constant operand during certain format conversion operations where the twos complement of operand A is needed. In such cases, operand A is inverted in stage 0 and 1 is added using IP adder 804. For other operations, mux 812 may select the result R2b.

IP adder 804 adds the results R2a and R2b (or R2a and the constant operand) to generate a sum RP. IP adder 804 also provides the two MSBs (RP2) of the sum RP via a path 805 to compare logic block 806. In the case of a multiplication or MAD operation, the sum RP is the product A*B. For other operations, the sum RP may represent A+B (e.g., where operands A and B are bypassed around multiplier tree 700) or ~A+1 (e.g., where operand A is inverted in stage 0 and bypassed around multiplier tree 700, with the constant operand being selected by input mux 812).

As noted above, results R2a and R2b may be wider than normal operands (e.g., 48 bits); accordingly, IP adder 804 may be implemented as a 48-bit adder, and path RP may be 49 bits wide to accommodate carries. Postmultiplier block 802 advantageously reduces sum RP to a result R3a having the normal operand width (e.g., 32 bits), e.g., by dropping LSBs. Sticky bit logic 808, which may be of generally conventional design, advantageously collects sticky bits SB3 (some or all of the bits that are dropped) and provides them to downstream components, which may use the sticky bits for rounding as described below. In parallel, integer mux 810 handles integer operands; mux 810 selects either the upper 32 bits or the lower 32 bits of the 49-bit sum RP in response to an OPCTL signal. The selection depends on how the operands R2a and R2b are aligned on wide paths 715, 717.

Output mux 814 selects the result R3a from the floating point path or integer path in response to an OPCTL signal that depends on the operation and the operand format and provides R3a on path 421. In addition, a bypass path 817 allows the result R2a to be bypassed around IP adder 804 and selected by output mux 814; thus, R2a (which may be operand A) can be propagated as result R3a on path 421.

Referring again to FIG. 4, Rshift count circuit 428 is responsive to an OPCTL signal. During an FMAD (or FADD) operation, Rshift count circuit 428 uses the exponent difference Ediff on path 725 to determine proper alignment for the floating-point addends (e.g., A*B and C). Specifically, the addend with the smaller exponent is to be right-shifted so that it can be represented using the larger exponent. Accordingly, Rshift count circuit 428 uses the sign of the exponent difference Ediff to determine whether A*B or C has the larger exponent and generates a swap control signal (SwapCtl) that controls which addend is right-shifted as described below. Rshift count circuit 428 also uses the magnitude of the exponent difference Ediff to generate a shift amount signal (RshAmt) that controls how far the selected addend is right shifted as described below. The shift amount can be clamped, e.g., based on the width of the addends. These signals are propagated to alignment block 420 on a path 441.

Through use of the OPCTL signal, Rshift count circuit 428 is leveraged for other operations where right-shifting may be used. Examples of such uses are described below.

Figure 8B:
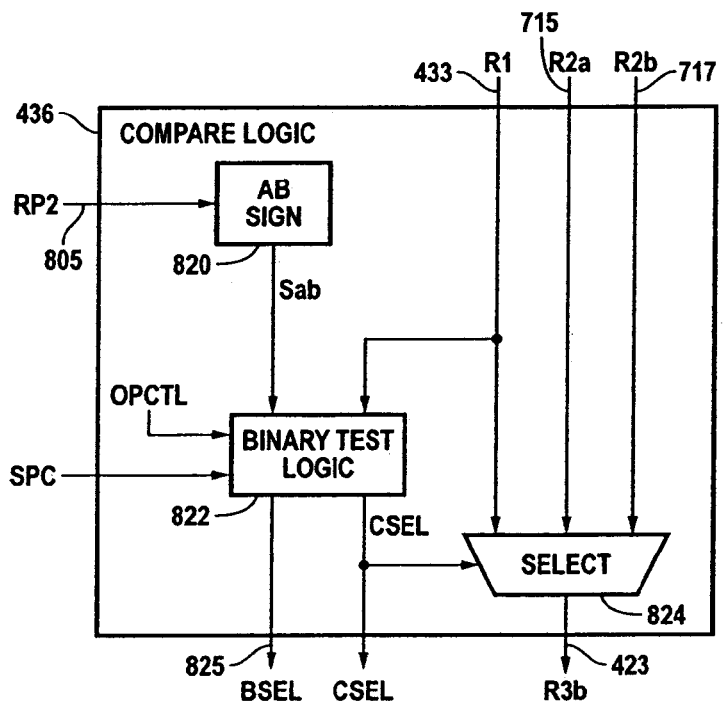
FIG. 8B is a block diagram of a compare logic block for the MMAD unit of FIG. 4.

FIG. 8B is a block diagram showing compare logic block 436, which includes an AB sign circuit 820, a binary test logic unit 822, and a selection mux 824. Compare logic block 436 is configured to receive inputs R1, R2a and R2b and to select one of them for propagation as result R3b on path 419. In the case of a MAD or addition operation, operand C is received as input R1 and propagated through compare logic block 436 without modification. For other operations, including LOP, CMP, MAX, MIN, and SET, compare logic block 436 may select a different one of its inputs.

AB sign circuit 820 receives the two MSBs RP2 from IP adder 804 (FIG. 8A) on path 805. In the case of maximum (FMAX or IMAX), minimum (FMIN or IMIN), or binary test (FSET or ISET) operations, operand B is advantageously inverted by conditional inverter 519 in stage 0 (see FIG. 5), and operands A and B are bypassed into IP adder 804 using selection muxes as described above. In such cases, the result RP is the difference A−B, and the MSBs RP2 indicate whether the difference is negative (implying B>A) or not. AB sign circuit 820 receives the MSBs and generates a sign signal Sab (e.g., a one-bit signal that is asserted if A−B is negative and deasserted otherwise). The sign signal Sab is provided to binary test logic unit 822 and to downstream components via a path 821.

In addition to the sign signal Sab, binary test logic unit 822 receives the special number signal SPC from special number detection block 438 of stage 1 (FIG. 4) via path 429, an OPCTL signal, and the result R1 from bitwise logic circuit 434 of stage 1. The result R1 is operand C for conditional select operations (FCMP, ICMP) or the output of XOR unit 634 for other operations where binary test logic unit 822 in stage 3 is active.

In response to these input signals, binary test logic unit 822 generates a comparison select signal (CSEL) that controls the operation of selection mux 824, as well as a Boolean result signal (BSEL) that is propagated to stage 7 on a path 825 as shown in FIG. 4. The CSEL signal may also be propagated to downstream components via a path 827.

Generation of the CSEL and BSEL signals is operation-dependent. In the case of FMAX, IMAX, FMIN, or IMIN, operands A and B are bypassed around multiplier tree 700 (FIG. 7A) and provided as results R2a and R2b. Binary test logic 822 generates a CSEL signal to select one of these two operands based on the sign signal Sab.

For conditional select operations (FCMP, ICMP), result R1 on path 433 is operand C. The special number signal SPC indicates, inter alia, whether operand C is zero (or any other special number). Binary test logic 822 uses the sign bit of operand C and the special number signal SPC to determine whether the condition C≧0 is satisfied and selects one of operands A (R2a) and B (R2b) accordingly.

For binary test operations (FSET, ISET), binary test logic 822 generates a Boolean true or false signal BSEL. This signal is provided via path 825 to stage 7, where it is used to generate an appropriate 32-bit representation of the Boolean result. In this case, result R1 on path 433 provides the 32-bit XOR2 result. Binary test logic 822 performs four basic tests: "unordered" (A?B), "equal to" (A=B), "greater than" (A>B) and "less than" (A<B). The A?B test yields Boolean true if at least one of A and B is INF or NaN, which can be determined by reference to the special number signal SPC. The A=B test yields Boolean true if all bits of the XOR result on path R1 are zero. The A<B test yields Boolean true if the sign signal on path Sab indicates that A−B is a negative number. The A>B test yields Boolean true if the other three tests all yield false. Negative tests (not equal, not greater, not less, not unordered) can be resolved by inverting results of the four basic tests. Additional combination tests (e.g., A≦B and so on) can be supported by constructing a suitable Boolean OR of results from the four elementary tests or their negations. In one embodiment, binary test logic 822 is configured to execute multiple tests in parallel and select a result BSEL based on the OPCTL signal. Any of the inputs to mux 824 may be selected as result R3b, since that result will be ignored during SET operations.

F. Elements of Stage 4

Referring again to FIG. 4, stage 4 includes an alignment block 420 and an exponent increment block 430.

Figure 9:
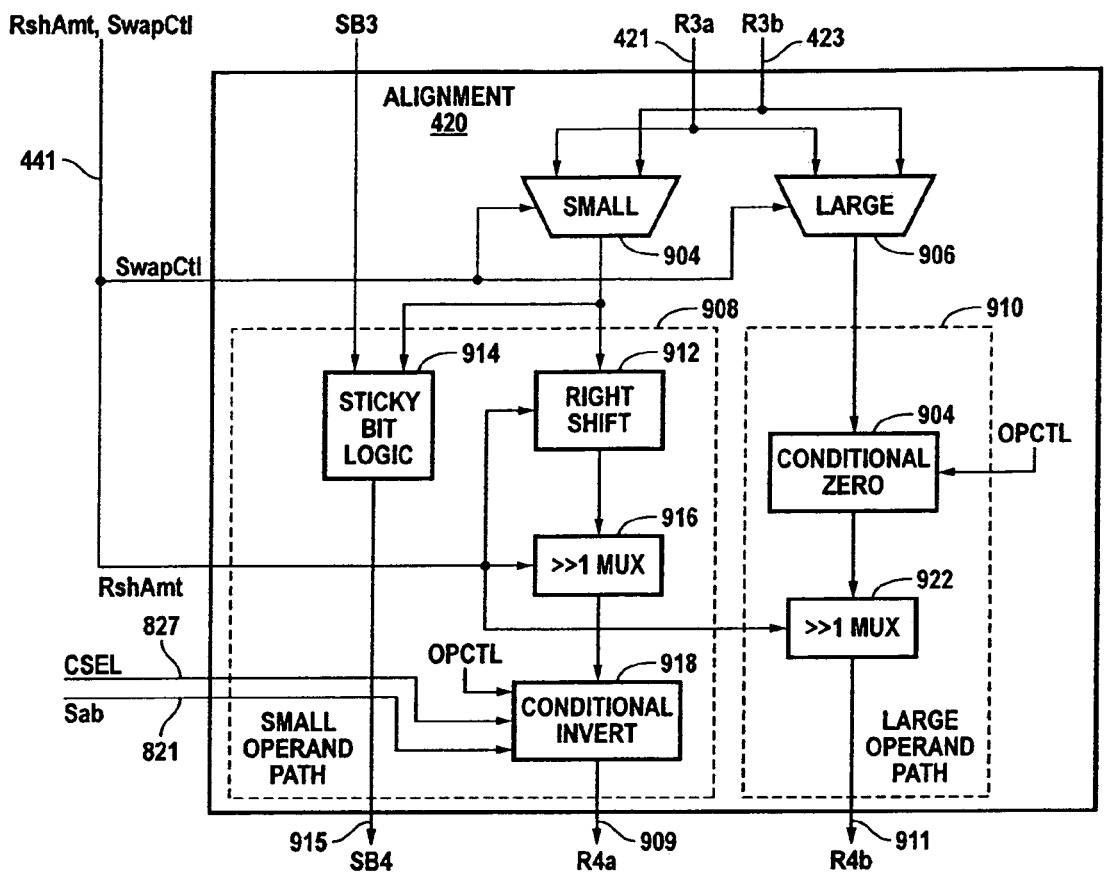
FIG. 9 is a block diagram of an alignment block for the MMAD unit of FIG. 4.

FIG. 9 is a block diagram showing alignment block 420. During an FMAD or FADD operation, alignment block 420 is used to align the mantissas in preparation for floating-point addition. Alignment block 420 is also leveraged to perform right-shifting during other operations as described below. Control signals for alignment block 420 are provided in part by Rshift count circuit 428 via path 441.

Alignment block 420 includes a "small" swap mux 904 and a "large" swap mux 906, each of which receives inputs R3a and R3b from paths 421, 419. Small swap mux 904 and large swap mux 906 are under common control of the SwapCtl signal from Rshift count circuit 428 so that when small swap mux 904 directs one of the inputs R3a, R3b into a small operand path 908, large swap mux 906 directs the other input R3b, R3a into a large operand path 910. In the case of an FMAD operation, the operands correspond to (A*B) and C, and the operand with the smaller exponent is directed into small operand path 908.

Small operand path 908 includes a right-shift circuit 912, sticky bit logic 914, a shift mux 916, and a conditional inverter 918. Right-shift circuit 912 right-shifts the data bits on small operand path 908, with the amount of shift (e.g., zero to 32 bits) being controlled by the RshAmt signal from Rshift count circuit 804. In one embodiment, right-shift circuit 912 can be controlled to perform either arithmetic or logical shifting, either via the RshAmt signal or via a separate OPCTL signal (not shown).

Sticky bit logic 914 captures some or all of the LSBs shifted out by right shift circuit 912 and provides sticky bits SB4 via a path 915 to stage 5 for use in rounding as described below. In one embodiment, sticky bit logic 914 also receives the sticky bits SB3 from stage 3 (see FIG. 8A) via path SB3; whether sticky bit logic 914 propagates the received sticky bits SB3 or generates new sticky bits can be controlled in response to an OPCTL signal.

Shift mux 916 is provided to adjust the alignment in the event that a preceding multiplication results in a carry-out into the next bit position. It can also be used to support correct implementation of the alignment shift in cases where the exponent difference (Ediff), on which the shift amount RshAmt is based, is negative. Such cases can be handled by inverting the Ediff value in Rshift count circuit 428 to obtain RshAmt, then operating shift mux 916 to perform a further right shift by 1 bit. In some embodiments, shift mux 916 can also be used to support operations where zero should be returned when an operand is shifted by 32 bits without using additional special logic.

Conditional inverter 918 can invert the operand on small operand path 918 or not in response to an OPCTL signal and in some instances other signals such as the CSEL signal or Sab signal from compare logic block 436 (see FIG. 8B). Conditional inversion can be used, e.g., to implement subtraction operations during stage 5. The output signal R4a is provided on a path 909 to stage 5.

Large operand path 910 includes a conditional zero circuit 920 and a shift mux 922; Conditional zero circuit 920, which is responsive to an OPCTL signal, can be used to replace the operand on path 910 with zero. This is used, e.g., during operations where it is desirable to pass R3a or R3b through the adder at stage 5 (described below) without modification. For FMAD operations, conditional zero circuit 920 is inactive, and the large operand passes through without modification. Shift mux 922, like shift mux 916, can be used to adjust the alignment in the event of a carry-out in a preceding multiplication.

The output signal R4b from large operand path 410 is provided to stage 5 on path 911.

Referring again to FIG. 4, exponent increment block 430 receives an effective final exponent EFE on path 723 and the product result R3a on path 421 (or just the most significant bits of the product result). During an FMAD or FMUL operation, exponent increment block 430 detects whether the addition of the 48-bit sum and carry results (R2a, R2b) in postmultiplier block 418 resulted in a carry into the 49th bit position. If so, then the effective final exponent EFE is incremented by 1. The modified (or not) effective final exponent EFE2 is provided to stage 4 via a path 443.

G. Elements of Stage 5

Stage 5 includes fraction sum block 422. During addition and MAD operations, this block performs the addition. Rounding for all operations that use it is also implemented at this stage.

Figure 10:
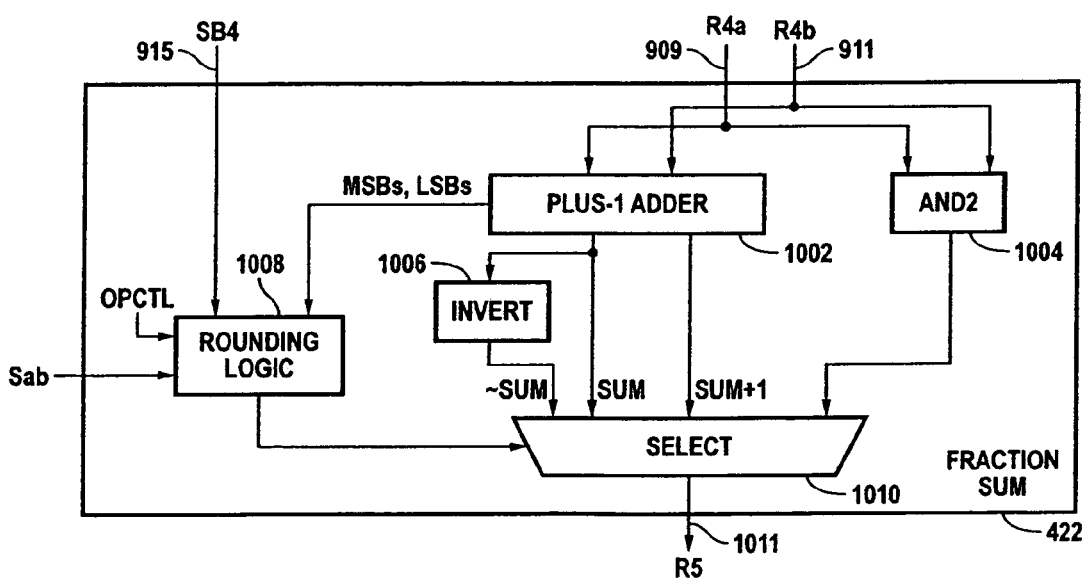
FIG. 10 is a block diagram of a fraction sum block for the MMAD unit of FIG. 4.

FIG. 10 is a block diagram of fraction sum block 422, which includes a plus−1 adder 1002, an AND2 circuit 1004, an inverter 1006, a rounding logic unit 1008, and a selection mux 1010. Addends R4a and Rb are received on paths 909, 911 from alignment block 420. Plus−1 adder 1002, which may be of generally conventional design, adds the addends to generate a Sum output and adds 1 to the sum to generate a Sum+1 output. Inverter 1006 inverts the Sum output to generate a ~Sum output. These outputs support twos-complement arithmetic as well as rounding.

In parallel, AND2 circuit 1004 performs logical AND operations on corresponding bits of the operands R4a and R4b and provides a 32-bit result. AND2 circuit 1004 is used during FRC operations as described below. During other operations, AND2 circuit 1004 may be bypassed or placed in a low-power idle state.

Rounding logic 1008, which may be of generally conventional design, receives an OPCTL signal, the sign signal Sab on path 821 from compare logic block 436 (see FIG. 8B), the sticky bits SB4 on path 915, and selected MSBs and LSBs from plus−1 adder 1002. In response to these signals, rounding logic 1008 directs mux 1010 to select as a result R5 one of the Sum, Sum+1, ~Sum and AND2 outputs; the selected result R5 is propagated on path 1011.

Selection of result R5 depends on a number of considerations. For example, rounding logic 1008 advantageously implements the four rounding modes (nearest, floor, ceiling, and truncation) defined for IEEE standard arithmetic, with different modes possibly selecting different results. The OPCTL signal or another control signal (not shown) may be used to specify one of the rounding modes. In addition, the selection will also depend on the format (integer or floating-point), whether the result is positive or negative, whether absolute value or negation was requested, and similar considerations. Conventional rules for rounding positive and negative numbers according to the various rounding modes may be implemented. For FRC operations, the output of AND2 circuit 1004 is selected; for other operations, this output may be ignored.

H. Elements of Stage 6

Referring again to FIG. 4, stage 6 includes a normalization block 423 and an exponent decrement block 432. During an FMAD, FMUL, or FADD operation, normalization block 423 operates to align the mantissa R5 by left-shifting the result until the leading bit is a 1. Since left-shifting in this context implies multiplication by 2, the left shift amount is provided to exponent decrement block 432, which correspondingly reduces the exponent EFE, thereby generating a final exponent E0. During other operations, normalization block 423 is leveraged to perform left-shifting as described below.

Figure 11:
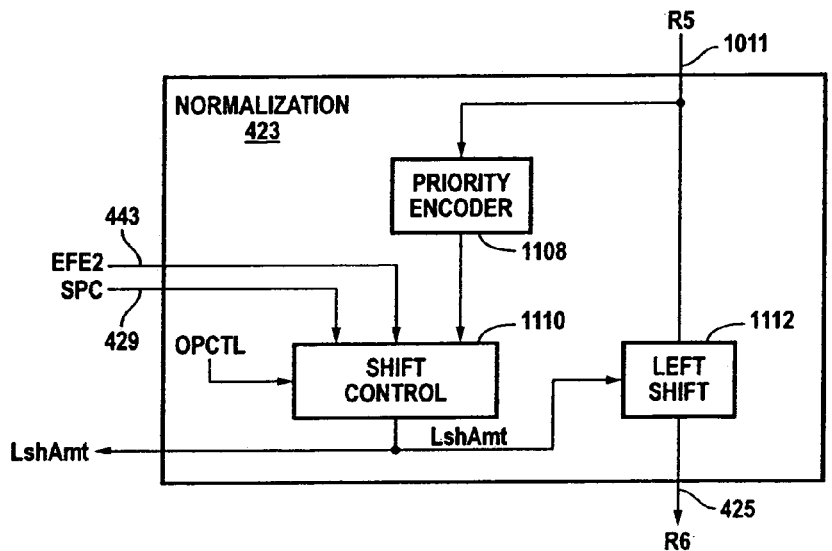
FIG. 11 is a block diagram of a normalization block for the MMAD unit of FIG. 4.

FIG. 11 is a block diagram of normalization block 423. A priority encoder 1108 receives the addition result R5 on path 1011 and determines the position of the leading 1. This information is provided to a shift control circuit 1110, which generates a left-shift amount signal LshAmt. The LshAmt signal is provided to a left-shift circuit 1112 and also to exponent decrement block 432 (FIG. 4). Left shift circuit 1112 shifts the result R5 to the left by the specified number of bits and provides a result R6 on path 425. Exponent decrement block 432 reduces the exponent EFE2 in accordance with the LshAmt signal and provides the resulting final exponent E0 on path 427.

Shift control circuit 1110 also receives an OPCTL signal, the EFE2 signal from path 443, and the special number signal SPC from path 429, allowing left shift circuit 1112 to be leveraged to perform left shifting in other contexts, examples of which are described below.

I. Elements at Stage 7

Figure 12:
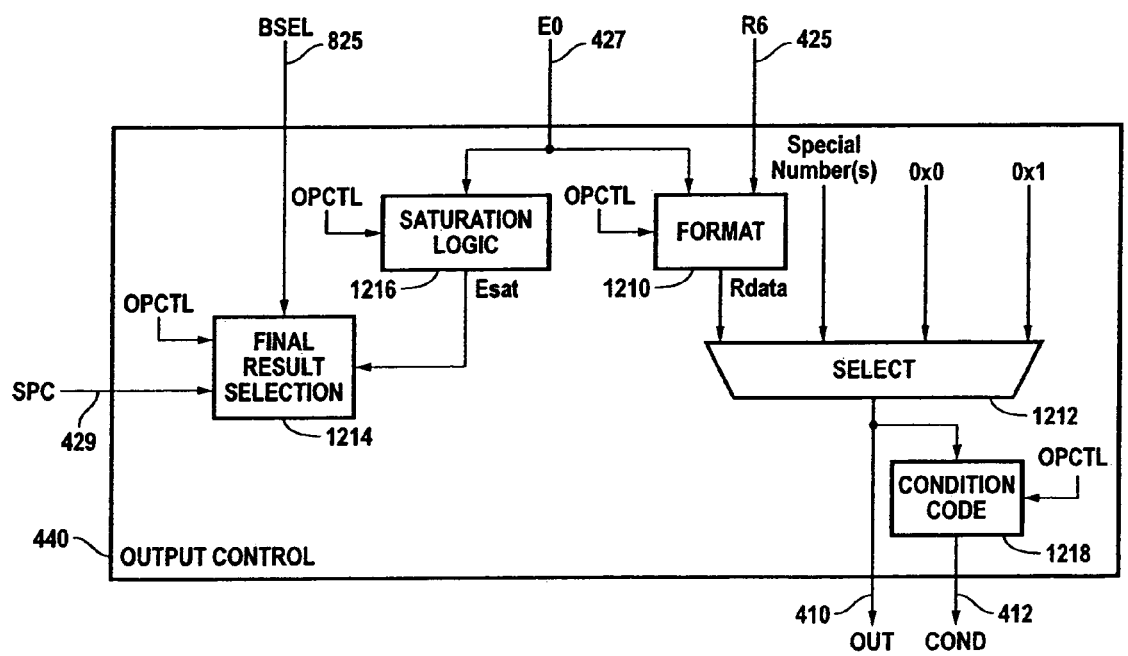
FIG. 12 is a block diagram of an output control block for the MMAD unit of FIG. 4.

Referring again to FIG. 4, Stage 7 includes output control block 440, which formats and selects the final result (OUT and COND) for delivery via paths 410, 412 to components external to MMAD unit 220. FIG. 12 is a block diagram of output control block 440. For floating-point operations, a format block 1210 receives the final exponent E0 via path 427 and the final mantissa R6 via path 425. For floating-point operations, format block 1210 uses values E0 and R6 to generate a result Rdata in the fp32 or fp16 format specified by an OPCTL signal.

For integer operations, format block 1210 receives the result R6 and discards the exponent E0. Format block 1210 may pass through the integer result R6 unmodified or apply appropriate formatting, e.g., aligning the valid bits in the appropriate positions of a 32-bit result for integer formats that use fewer than 32 bits. In some embodiments, format block 1210 also clamps integer outputs that overflow or underflow (e.g., to the maximum or minimum value for the specified integer format).

The formatted result Rdata is provided as an input to a final selection mux 1212 that selects between result Rdata and one or more predefined values as the final result OUT on path 410. In one embodiment, the predefined values include the special numbers NaN and INF in fp16 and fp32 formats, as well as 32-bit Boolean true (e.g., 0x1) and false (e.g., 0x0) values. The selected final result OUT is also provided to a condition code circuit 1218 that generates a condition code COND based on the result. Since the result format depends in part on the opcode, condition code circuit 1218 receives an OPCTL signal indicating the expected format. Examples of condition codes are described above.

During floating-point arithmetic operations, exponent saturation logic 1216 receives the final exponent E0 and determines whether an exponent overflow (or underflow) has occurred. The determination is advantageously based in part on an OPCTL signal indicating whether fp16 or fp32 format is in use. Exponent saturation signals Esat from exponent saturation logic 1216 are provided to final result selection logic 1214.

Final result selection logic 1214 controls the operation of final selection mux 1212 in response to a combination of control signals, including an OPCTL signal, the special number signal SPC on path 429 (from stage 1), the Boolean selection signal BSEL on path 825 (from stage 3), and the exponent saturation signal Esat. The selection of a final result varies depending on the operations and result formats, as well as the occurrence of special numbers or saturation.

For example, in the case of floating-point arithmetic operations, final result selection logic 1214 advantageously uses the special number signal SPC to implement rules for arithmetic involving special numbers (e.g., that NaN added to or multiplied by any number is NaN, and so on). Where one of the input operands (A, B, or C) is a special number, final result selection logic 1214 instructs mux 1212 to select the corresponding special number in preference to the result Rdata. In addition, final result selection logic 1214 also uses the saturation signal Esat to select a special number (e.g., INF or zero) in the event of an exponent overflow or underflow condition.

In the case of binary test (FSET, ISET) operations, final result selection logic 1214 uses the Boolean selection signal BSEL to select between the Boolean true and logical false outputs, ignoring the numerical result Rdata.

J. Operand Bypass or Pass-through Paths

As described above, MMAD unit 220 provides bypass or passthrough paths allowing operands to propagate unmodified through various circuit blocks. For example, operand A passes through premultiplier block 416 at stage 1 (see FIG. 6A). Operand A can be further bypassed around multiplier tree 700 at stage 2 (see FIG. 7A) as result R2a, bypassed around IP adder 804 at stage 3 (see FIG. 8A) as result R3a, and propagated through small operand path 908 at stage 4 (see FIG. 9) as result R4a. In addition, conditional zero unit 920 may force the result R4b to zero so that operand A is added to zero by plus−1 adder 1002 at stage 5 (see FIG. 10). If the Sum result is then selected by mux 1010, the result R5 is operand A.

Similarly, operand B can be bypassed around premultiplier block 416 at stage 1 (see FIG. 6A) to path BB and bypassed around multiplier tree 700 at stage 2 (see FIG. 7A) as result R2b. Operand C can be passed through bitwise logic block 434 at stage 1 (see FIG. 6C) as result R1 and through compare logic block 436 at stage 3 (see FIG. 8B) as result R3b. In this embodiment, further bypass paths for operands B and C are not provided; in alternative embodiments, further bypassing (e.g., similar to that shown for operand A) could be provided if desired.

Thus, operational descriptions in Section III refer to various operands being bypassed or passed through to a particular stage; it is to be understood that following a bypass or pass-through path through some stages does not necessarily require continuing to follow the bypass path at subsequent stages. In addition, a value that is modified in one stage may follow a bypass pass through a subsequent stage. Where a particular circuit block is bypassed during an operation, that block may be set into an inactive state to reduce power consumption or allowed to operate normally with its output being ignored, e.g., through the use of selection muxes or other circuit elements.

It will be appreciated that the MMAD unit described herein is illustrative and that variations and modifications are possible. Many of the circuit blocks described herein provide conventional functions and may be implemented using techniques known in the art; accordingly, detailed descriptions of these blocks have been omitted. The division of operational circuitry into blocks may be modified, and blocks may be combined or varied. In addition, as will become apparent below, the number of pipeline stages and the assignment of particular circuit blocks or operations to particular stages may also be modified or varied. The selection and arrangement of circuit blocks for a particular implementation will depend on the set of operations to be supported, and those skilled in the art will recognize that not all of the blocks described herein are required for every possible combination of operations.

III. Examples of MMAD Unit Operations

MMAD unit 220 advantageously leverages the circuit blocks described above to support all of the operations listed in FIG. 3 in an area-efficient manner. Accordingly, the operation of MMAD unit 220 depends in at least some respects on which operation is being executed. The following sections describe the use of MMAD unit 220 to perform each of the operations listed in FIG. 3.

A. Floating Point Operations

Floating point operations supported by MMAD unit 220 are shown at 302 in FIG. 3. For arithmetic operations (FADD, FMUL, FMAD), exponent path 415 is used to compute the exponent while mantissa path 413 is used to compute the mantissa. Other floating-point operations (FCMP, FMIN, FMAX and FSET) exploit the property that in fp32 and fp16 formats, relative magnitudes can be accurately determined by treating the numbers as if they were 32-bit unsigned integers; these operations are handled using mantissa path 413 and test path 417.

1. FMAD Operation

The FMAD operation computes A*B+C for operands A, B, and C that are supplied to MMAD unit 220 in fp16 or fp32 format, returning a result in the same format as the input operands.

In stage 0, operands $A_0$, $B_0$, and $C_0$ are received and passed through formatting block 400 to operands A, B, and C without modification through the operation of selection muxes 514–516 (FIG. 5).

In stage 1, premultiplier block 416 computes 3A from the mantissa portion of operand A and Booth3 encodes the mantissa portion of operand B, propagating the Booth-encoded mantissa on path BB. Exponent product block 424 receives the exponent portions (Ea, Eb) of operands A and B and computes Ea+Eb, with bias β advantageously being used to re-establish the correct fp16 or fp32 exponent bias in the sum. The mantissa portion of operand C is delivered to bitwise logic block 434, where operand C is selected by mux 636 (FIG. 6C) and propagated as result R1 onto path 433. The exponent portion (Ec) of operand C is routed on path 439 into exponent path 415. Also during stage 1, special number detection block 438 determines whether any of operands A, B, or C is a special number and generates appropriate special number signals SPC on path 429 for use in stage 7.

In stage 2, multiplier block 414 computes the mantissa portion of A*B and selects the sum and carry fields as results R2a and R2b. Exponent sum block 426 receives the product exponent on path Eab on path 431 the exponent portion (Ec) of operand C on path 439. Difference unit 704 (FIG. 7B) computes Eab−Ec and propagates the result Ediff on path 725. Also, based on the sign of Eab−Ec, one of Eab and Ec is selected as the effective final exponent EFE. The mantissa of operand C (R1) is passed through on path 433.

In stage 3, post-multiplier block 418 adds the sum and carry results R2a and R2b, providing the result R3a on path 421. Sticky bit logic 808 (FIG. 8A) may operate, but in this embodiment, sticky bits SB3 path are ignored at later stages so that the product A*B is truncated rather than rounded. Rshift count block 428 uses the sign of Ediff on path 725 to determine which operand to shift for a floating-point addition and generates a corresponding SwapCtl signal. Rshift count block 428 also uses the magnitude of the value on path Ediff to determine the number of bits by which to shift the selected operand and generates an appropriate RshAmt signal. Compare logic 436 passes through the mantissa portion of operand C as result R3b on path 419.

In stage 4, alignment block 420 receives the mantissa of the product A*B as result R3a and the mantissa of operand C as result R3b. Based on the SwapCtl signal from Rshift count block 804, swap muxes 904, 906 (FIG. 9) direct one of the operands into small operand path 908 and the other into large operand path 910. The small operand is right-shifted by right-shift circuit 912, with sticky bit logic 914 generating sticky bits SB4 from the bits that are shifted out. The resulting aligned addends R4a, R4b are provided on paths 909, 911. Exponent increment block 430 (FIG. 4) receives the mantissa of the product A*B (R3a), and increments the effective final exponent EFE or not, as described above. The result EFE2 is propagated on path 443.

In stage 5, fraction sum block 422 receives the aligned addends R4a and R4b. Plus-1 adder 1002 (FIG. 10) generates Sum and Sum+1 outputs, and inverter 1006 provides an inverted Sum. Rounding logic 1008 receives the sticky bits on path SB4 and controls selection mux 1010 to select between the Sum and Sum+1 outputs based on the sticky bits, the selected rounding mode, and the sign of the sum computed in Plus-1 adder 1002. The resulting mantissa R5 is propagated onto path 1011.

In stage 6, normalization block 423 normalizes the mantissa R5. Priority encoder 1108 (FIG. 11) detects the position of the leading 1 and provides that data to shift control unit 1110, which generates a corresponding LshAmt signal. Left shift block 1112 shifts the mantissa left and propagates the result R6 onto path 425. Exponent decrement block 432 (FIG. 4) adjusts the effective final exponent EFE2 down accordingly and propagates the resulting final exponent E0 onto path 427.

In stage 7, output control circuit 440 generates the final result. Format block 1210 (FIG. 12) receives the exponent E0 and the mantissa R6 and generates a normal number on Rdata in the proper format (e.g., fp32 or fp16). Saturation logic 1216 evaluates the exponent E0 according to the specified format, detects any overflow, and generates an appropriate saturation signal Esat. Final result selection logic 1214 receives the saturation signal Esat as well as the special number signal SPC. For this operation, final result selection logic 1214 directs mux 1212 to select result Rdata unless the Esat or SPC signal indicates that the final result should be a special number. In that case, the appropriate special number is selected as the final result. As noted above, final result selection logic 1214 can implement IEEE 754-compliant rules (or other rules) for cases where one of the input operands is a special number.

2. FMUL and FADD Operations

For floating-point multiplication (FMUL), MMAD unit 220 receives the multiplicand as operand A and the multiplier as operand B; the value 0.0 (floating-point zero) is advantageously supplied for operand C. The FMAD operation as described above is then executed to generate the product A*B(+0.0), except that in stage 4, sticky bit logic 914 (FIG. 9) advantageously passes through the sticky bits SB3 from stage 3, allowing the product to be rounded. In some embodiments, operand C may be forced to zero through the use of conditional zero block 920 (FIG. 9) in stage 4 so that any value may be supplied for operand C.

For floating-point addition (FADD), MMAD unit 220 receives the addends as operands A and C. In one embodiment, an FMAD operation is performed with operand B set to 1.0 to compute (A*1.0)+C; setting operand B to 1.0 can be done, e.g., by providing floating-point 1.0 as operand B to MMAD unit 220 or by operating premultiplier selection mux 616 (FIG. 6A) to select the Booth3 encoded 1.0 from register 620.

In an alternative implementation of FADD, operand B is set to 0.0 (e.g., by providing floating-point zero as an input operand to MMAD unit 220), and operands A and B are bypassed to stage 3, where the sum A+0.0 can be computed by IP adder 804 (FIG. 8A) in post-multiplier block 418 or, in an alternative embodiment, operand A can be further bypassed around IP adder 804 as result R3a. Subsequent stages operate as for an FMAD operation to compute A+C.

3. FMIN and FMAX Operations

The floating point maximum (FMIN) and minimum (FMIN) operations return the one of their two operands that is larger or smaller. As noted above, these and other comparison-based operations are handled using components of mantissa path 413 and test path 417. MMAD unit 220 receives operands A and B on which the FMAX or FMIN operation is to be performed; operand C may be set to any value.

For FMIN and FMAX operations, operand B is inverted (to ~B) at stage 0, and all 32 bits of operands A and ~B are passed through to stage 3 as results R2a and R2b, respectively. In stage 3, IP adder 804 (FIG. 8A) computes the sum A+~B (i.e., A–B). The two MSBs of this result RP2 are provided to compare logic block 436. It should be noted that although operands A and B are floating-point numbers, for purposes of comparison operations, they can be subtracted as if they were integers because of the way the fp32 and fp16 formats are defined.

In compare logic block 436, AB sign circuit 820 (FIG. 8B) receives the signal on path RP2 and generates the appropriate sign signal Sab. Binary test logic 822 makes a selection as described above: for FMAX, B is selected if (A+~B) is negative (i.e., if B is larger than A) and A is selected otherwise; for FMIN, A is selected if (A+~B) is negative and A is selected otherwise. It should be noted that the case where A=B is not treated specially since selecting either operand for either FMIN or FMAX would yield the correct result Binary test logic 822 generates an appropriate CSEL signal instructing mux 824 to propagate the appropriate one of R2a (operand A) and R2b (operand ~B) as result R3b.

In stage 4, small swap mux 904 (FIG. 9) selects the result R3b for propagation to small operand path 908 while large swap mux 906 selects the result R3a, which may be A–B due to the operations during stage 3. Rshift count circuit 428 may be used to generate the appropriate state for the SwapCtl signal to produce this result in response to the OPCTL signal, without regard for the exponents. In large operand path 910, conditional zero block 914 is operated to zero out result R4b. In small operand path 908, the result R3b is propagated through as result R4a. If operand ~B (which was inverted at stage 0) was selected at stage 3, conditional invert circuit 918 may be used to re-invert the result R4a. To detect this case, conditional invert circuit 918 may receive the CSEL signal from path 827 (see FIG. 8B).

In stage 5, plus-1 adder 1002 (FIG. 10) adds R4a (A or B) and R4b (zero). The Sum result (i.e., the selected operand A or B) is selected by mux 1010 as result R5.

In stage 6, shift control circuit 1110 (FIG. 11) responds to the OPCTL signal by setting LshAmt to zero so that the result R5 is propagated through as result R6 without modification.

In stage 7, format block 1210 (FIG. 12) can provide result R6 unaltered as result Rdata. In the event that A or B was a special number, final result selection logic 1214 may operate mux 1212 to override the result Rdata with an appropriate special number. For instance, if A or B is NaN, the FMAX or FMIN result can be forced to NaN.

4. FSET Operations

For binary test (FSET) operations, MMAD unit 220 receives operands A and B; any value may be provided as operand C. As with the FMIN and FMAX operations described above, operand B is inverted at stage 0 and operands A and ~B are bypassed to stage 3, where they are subtracted using PP adder 802 (FIG. 8A), with the MSBs RP2 being provided to compare logic block 436.

In stage 1, while operands A and ~B are being passed through, bitwise logic block 434 operates, with mux 636 (FIG. 6C) selecting the result of XOR2 unit 634 for propagation as result R1.

In stage 3, AB sign circuit 820 (FIG. 8B) receives the signal RP2 and generates the sign signal Sab. Binary test logic 822 receives the Sab signal, the XOR2 result (R1), the special number signal SPC, and an OPCTL signal that specifies which binary test is to be performed. Binary test logic 822 performs its tests as described above (see Section II.E) and propagates the Boolean result BSEL onto path 825.

The Boolean result BSEL propagates on path 825 to stage 7. The various circuit blocks in stages 4 through 6 may operate on whatever signals happen to appear in the appropriate signal paths, or they may be disabled. The results of any operations executed in stages 4–6 will be ignored by output control block 440.

In stage 7, final result selection logic 1214 receives the Boolean result BSEL and operates final selection mux 1212 to select between the Boolean true (e.g. 0x1) and false (e.g., 0x0) values accordingly. The result BSEL correctly reflects whether the operands were special numbers, and final result selection logic 1214 may ignore the special number signal SPC during FSET operations.

5. FCMP Operation

For the ternary conditional selection operation (FCMP), MMAD unit receives operands A, B, and C. Operands A and B are passed through to stage 3 as results R2a and R2b, respectively. Operand C is passed through to stage 3 as result R1.

At stage 3, binary test logic 822 (FIG. 8B) receives operand C (R1) and the special number signal SPC. As described above (see Section II.E), binary test logic 822 uses these signals to determine whether the condition C≧0 is satisfied. Binary test logic 822 instructs mux 824 to select operand A (R2a) if C≧0 and operand B (R2b) otherwise. Since NaN is neither greater than nor equal to zero, operand B would be selected where operand C is NaN.

The selected value is propagated as result R3b to stage 7 in the manner described above for FMIN and FMAX operations. (Result R3a may be the sum of operands A and B from IP adder 804 (FIG. 8A), or operand A may be selected as result R3a; in either case, result R3a does not affect the final result.) In stage 7, final result selection logic 1214 advantageously detects cases where operand C is NaN and overrides the propagated result with a NaN value.

B. Integer Arithmetic

Integer operands do not include exponent bits. In the formats used herein, signed integers are represented using twos complement; those of ordinary skill in the art will recognize that other representations could be substituted. As described below, integer arithmetic operations are generally similar to their floating-point counterparts, except that the exponent logic is not used.

1. IMAD

For integer MAD (IMAD) operations, MMAD unit 220 uses mantissa path 413 to compute A*B+C. Although some integer formats may be unsigned, MMAD unit 220 advantageously treats all formats as being signed 32-bit twos-complement representations; this inherently produces the correct results regardless of actual format.

In stage 0, the operands A, B, and C are extended to 32 bits if necessary using blocks 504–506 (FIG. 5) for 8-bit input formats or 508–510 (for 16-bit formats).

In stage 1, premultiplier block 416 computes 3A and a Booth3 encoding of operand B. Bitwise logic block 434 propagates operand C as result R1.

In stage 2, multiplier block 414 computes A*B and selects the sum and carry fields for the product as results R2a and R2b.

In stage 3, postmultiplier block 418 adds the sum and carry fields using IP adder 804 (FIG. 8A). Integer mux 810 selects the upper 32 bits, and selection mux 812 selects this as result R3a. Compare logic block 436 propagates operand C (R1) as result R3b.

In stage 4, alignment unit 420 receives R3a (the product A*B) and R3b (operand C). Since integer addition does not require mantissa alignment, Rshift count circuit 428 may generate the SwapCtl signal in a consistent state for all IMAD operations so that, e.g., R3a (R3b) is always directed into small (large) operand path 908 (910) (FIG. 9) or vice versa. Alternatively, if one of the operands is negative, that operand may be routed into small operand path 908 and inverted by conditional inverter 918. Sticky bit logic 914 operates to generate sticky bits SB4 on path 915.

In stage 5, plus–1 adder 1002 (FIG. 10) adds the values R4a and R4b (representing A*B and C), and rounding logic 1008 selects the appropriate one of Sum, Sum+1 and ~Sum outputs based on the signs of the received operands and the sticky bits SB4. The result R5 is propagated onto path 1011.

In stage 6, the result R5 is passed through normalization block 423 without modification.

In stage 7, formatting block 1210 receives the result R6 and formats it if necessary to match the input operand format. Formatting block 1210 advantageously also detects any overflows and clamps the result value Rdata to the maximum allowed value for the input format. Final result selection logic 1214 selects the value on path Rdata as the final result OUT.

2. Multiplication (IMUL) and Addition (IADD)

Similarly to the FMUL and FADD operations described above, the integer multiplication (IMUL) and addition (IADD) operations leverage the MAD pipeline. For IMAD operations, MMAD unit 220 receives the multiplicand as operand A and the multiplier as operand B; the value 0 (integer zero) is advantageously supplied for operand C. The IMAD operation as described above is then executed to generate the product A*B(+0), except that in stage 4, sticky bit logic 914 (FIG. 9) advantageously passes through the sticky bits SB3, allowing the product to be rounded. In some embodiments, operand C may be forced to zero through the use of conditional zero block 920 (FIG. 9) in stage 4 so that any value may be supplied as operand C.

For integer addition (IADD), MMAD unit 220 receives the addends as operands A and C. In one embodiment, an IMAD operation is performed with operand B set to 1 to compute (A*1)+C; setting operand B to 1 can be done, e.g., by providing integer 1 as operand B to MMAD unit 220 or by operating premultiplier selection mux 616 (FIG. 6A) to select a Booth3 encoded integer 1, e.g., from register 620 or a different register.

In an alternative implementation of IADD, operand B is set to 0 (e.g., by providing integer zero as an input operand to MMAD unit 220), and operands A and B are bypassed to stage 3 where the sum A+0 can be computed in by IP adder 804 (FIG. 8A) in post-multiplier block 802 or, in a different embodiment, operand A can be bypassed around IP adder 804 as result R3a. Subsequent stages operate as for an IMAD operation to compute A+C.

3. Sum of Absolute Difference: ISAD

For integers, a sum of absolute difference (ISAD) operation is supported. This operation computes |A–B|+C. At stage 0, operands A, B, and C are received, and operand B is inverted by inverter 519 (FIG. 5) to produce operand ~B. The operands are then passed through stages 1 and 2.

In stage 3, postmultiplier block 418 computes A–B by adding A and ~B in IP adder 804 (FIG. 8A) and propagates the result R3a. In compare logic block 436 (FIG. 8B), AB sign circuit 820 detects the sign of A–B and generates a corresponding sign signal Sab that is forwarded to stages 4 and 5 on path 821. Binary test logic 822 controls selection mux 824 to propagate operand C as result R3b.

In stage 4, the absolute value of A–B is resolved. Specifically, the SwapCtl signal for an ISAD operation controls swap muxes 904 and 906 (FIG. 9) so that the result R3a (i.e., A–B) is routed into small operand path 908 and the result R3b (i.e., operand C) is routed into large operand path 910. Conditional inverter 918 on small operand path 908 receives the Sab signal from AB sign circuit 820 and inverts the operand (A–B) if the sign is negative. Thus, the result R4a corresponds to a non-negative integer, while operand C (which may be a positive or negative integer) is propagated as result R4b.

In stage 5, plus–1 adder 1002 adds the values from paths R4a and R4b. Based on the Sab signal, rounding logic 1008 selects either the Sum or Sum+1 output to provide the correct answer in twos-complement form. Specifically, if A–B is not negative, the result should be (A–B)+C, which is the Sum output. If A–B is negative, the result is C–(A–B), which is represented in twos complement as C+~(A–B)+1, which is the Sum+1 output due to conditional inversion in stage 4.

In stages 6 and 7, the result R5 is propagated through as for other integer arithmetic operations. In some embodiments, formatting block 1214 of stage 7 (FIG. 12) detects and handles overflows as described above.

4. Comparison Operations: IMIN, IMAX, ISET

As described above, floating-point comparisons FMIN, FMAX, FSET can be executed by treating the operands as integers. Accordingly, implementation of integer comparison operations IMIN, IMAX, and ISET is completely analogous to implementations of the floating-point comparisons described above in Sections III.A.3 and III.A.4.

5. Conditional Select Operation: ICMP

The integer conditional selection operation (ICMP) is also completely analogous to its floating-point counterpart, and the processing of this operation in MMAD unit 220 is identical to the implementation of FCMP described above in Section III.A.5.

C. Bitwise Logic Operations

In addition to integer and floating-point arithmetic functions, MMAD unit 220 also supports various bitwise logic operations (listed at 306 in FIG. 3) that manipulate bits of their operands without reference to what the bits might represent. These operations include the bitwise Boolean operations AND, OR, and XOR, as well as bit-shifting operations SHL (left shift) and SHR (right shift).

1. Boolean Operations: AND, OR, XOR

Boolean operations are handled primarily by bitwise logic block 434 in stage 1. For these operations, MMAD unit receives two 32-bit operands A and B (operand C may be set to any value since it is ignored) and an opcode indicating the desired Boolean operation. The operands are passed through stage 0.

In stage 1, bitwise logic block 434 receives operands A and B and executes, in parallel, bitwise AND, OR, and XOR operations on operands A and B using logic circuits 630, 632, 634 (FIG. 6C). Selection mux 636 receives an OPCTL signal indicating which Boolean operation is requested and propagates the corresponding result as R1. Operands A and B can be passed through premultiplier block 416 of stage 1 and multiplier block 414 of stage 2.

In stage 3, compare logic block 436 propagates the Boolean operation result R1 as result R3b. Post-multiplier block 418 may either add A and B or simply propagate A as result R3a; in either case, result R3a will be discarded.

In stage 4, swap muxes 904 and 906 (FIG. 9) direct result R3b onto small operand path 908 and result R3a onto large operand path 910. In small operand path 908, result R3b (the desired result) is propagated without modification as result R4a. In large operand path 910, conditional zero circuit 920 zeroes out result R4b in response to an OPCTL signal.

In stage 5, plus-1 adder 1002 (FIG. 10) adds R4b (zero) to R4a (the Boolean operation result), and mux 1010 selects the Sum result as result R5. In stage 6, no shift is applied to result R6. In stage 7, result R6 is propagated as the final result without further modification; there are no overflow or other special conditions for these operations.

2. Bit Shift Operations: SHL, SHR

MMAD unit 220 also performs bit shift operations to left-shift (SHL) or right shift (SHR) a bit field. For both operations, the 32-bit field to be shifted is provided to MMAD unit 220 as operand A, and the shift amount is advantageously provided to MMAD unit 220 by inserting an eight-bit integer value into the fp32 exponent bit positions of operand B. Since shift amounts larger than 31 are not of interest, eight bits are sufficient to carry the shift amount data. The sign and fraction bits of operand B are ignored for these operations and so may be set to any value, as may operand C.

The SHL operation leverages left-shift circuit 1112 of stage 6 (FIG. 11). Operand A is passed through to the output R5 of stage 5 as described in Section II.J above. In parallel, the exponent portion Eb of operand B, which indicates the shift amount, is also passed through exponent path 415 to result EFE2 on path 443. More specifically, in stage 1, shift amount Eb is bypassed through exponent product block 424 by operation of selection mux 628 (FIG. 6B). In stage 2, difference block 714 (FIG. 7B) responds to the OPCTL signal by instructing mux 716 to select input Eab (which is Eb) as the output EFE. Exponent increment block 902 passes through the EFE signal unmodified to path 443.

In stage 6, shift control block 1110 (FIG. 11) receives the shift amount Eb as signal EFE2 on path 443 and generates an LshAmt signal reflecting that amount. In some embodiments, shift control block 1110 may clamp the LshAmt signal, e.g., at 31 bits, if Eb is too large. In response to the LshAmt signal, left shift circuit 1112 shifts operand A (result R5) left by the appropriate number of bits, advantageously inserting trailing zeroes as needed. The left-shifted result R6 is propagated onto path 425. In some embodiments, exponent decrement block 432 propagates the shift amount signal EFE2 as final exponent E0 without modification.

In stage 7, the result R6 is advantageously provided without modification as the final result OUT. In some embodiments, stage 7 also includes logic for clamping the result to zero if the shift amount exceeds 31; this logic can be incorporated into saturation logic 1216, which can receive the shift amount as final exponent E0.

The SHR operation leverages right shift circuit 912 of stage 4 (FIG. 9). The SHR operation may be implemented to support both a logical shifting mode in which zero is inserted into each new MSBs and an arithmetic shifting mode in which the sign bit is extended into the new MSBs; the opcode advantageously selects a mode for each SHR operation.

As noted above, the operand to be shifted is provided as operand A, and the shift amount is provided using the exponent bits of an fp-32 operand B. Operand A is passed through the output of stage 3 (result R3a) as described in Section II.J above.

In parallel, the shift amount Eb is propagated to Rshift count circuit 804. More specifically, in stage 1, the shift amount Eb is bypassed through exponent product block 424 to path 431 by operation of selection mux 628 (FIG. 6B). In stage 2, difference block 714 (FIG. 7B) instructs mux 716 to select the Eab value as difference Ediff. The EFE signal may be ignored, and any of the candidate values may be selected as desired; in some embodiments, the Eab value is provided as the EFE value.

In stage 3, Rshift count circuit 428 generates an RshAmt signal corresponding to the Ediff signal (i.e., Eb). The RshAmt signal may be clamped, e.g., to 31 bits. In some embodiments, Rshift count circuit 408 determines, based on its received OPCTL signal, whether a logical or arithmetic shift is requested and includes a corresponding "shift type" bit in the RshAmt signal.

In stage 4, small swap mux 904 (FIG. 9) directs operand A onto small operand path 908. On large operand path 910, result R4b is zeroed by conditional zero circuit 920. On small operand path 908, right shift circuit 912 receives the RshAmt signal and right-shifts operand A by the specified number of bits. In some embodiments, right shift circuit 912 detects the shift type bit (logical or arithmetic) in the RshAmt signal and accordingly inserts either zero or one into the new MSBs as the operand is right-shifted.

In stage 5, result R4a (the right-shifted operand A) is added to R4b (zero) by plus–1 adder 1002 (FIG. 10) and selected as result R5. In stage 6, the result R5 propagates through normalization block 423 without further shifting. In stage 7, the result R6 is advantageously used without modification as the final result OUT. In some embodiments, stage 7 also includes logic for clamping the result to zero if the shift amount Eb exceeds 31; this logic can be incorporated into saturation logic 1216, which can receive Eb as described above for the left-shift operation.

D. Format Conversion Operations

MMAD unit 220 also supports conversions between various integer and floating-point formats. In some embodiments, format conversions are not performed concurrently with the arithmetic operations described above, but certain other operations can be combined with a format conversion. For example, various conversion operations can be combined with scaling by $2^N$ for integer N and/or with determining the absolute value or negation of the operand. The following sections describe conversions between floating-point formats, and between integer formats.

1. Floating-Point to Floating-Point Conversions (F2F)

Supported floating-point to floating-point (F2F) conversion operations include direct conversion from fp16 to fp32 and vice versa; such conversions may also incorporate absolute value, negation, and/or $2^N$ scaling. In addition, integer-rounding conversions from fp16 to fp16 and from fp32 to fp32 are also supported. In all cases, the number to be converted is provided to MMAD unit 220 as operand A, and where $2^N$ scaling is to be done, the scale factor N is provided using the eight exponent bits Eb of an fp32 operand B. For fp16 and fp32 formats, a sign bit is provided, and absolute value and negation can be implemented by manipulating the sign bit. Such manipulations are known in the art, and a detailed description is omitted.

Direct conversion from fp16 to fp32 uses up-converter 512 in stage 0 (FIG. 5) to generate an fp32 representation of operand A. Up-converter 512 adjusts the exponent bias to correspond to fp32 (e.g., by adding 127−15=112) and appends 13 trailing zeroes to the fraction. This conversion is correct unless operand A is an fp16 denorm. In stage 1, special number detection block 414 determines whether operand A is an fp16 denorm, INF, or NaN and generates appropriate signals on path SPC.

The mantissa portion of operand A is passed through to the output of stage 5 (result R5) as described in Section II.J above. The exponent portions Ea, Eb of operands A and B, respectively, are delivered to exponent product block 424 in stage 1; in this case, the exponent Eb is the exponential scale factor N. Exponents Ea and Eb are added in exponent product block 424, thereby accomplishing the $2^N$ scaling, with the result Eab being propagated onto path 431. In stage 2, exponent sum block 426 propagates the result Eab as the effective final exponent EFE. In stage 3, Rshift count circuit 428 responds to the OPCTL signal by generating signals for a zero shift, ignoring any Ediff signal that may be present on path 725. At stage 4, exponent increment block 430 forwards the exponent EFE onto path 433 (as EFE2) without modification.

Stage 6 is used to handle fp16 denorms, all of which can be represented as normal numbers in fp32. As described above, denorms are interpreted as having the minimum allowed exponent and not having an implied integer 1 in the mantissa. At stage 6, priority encoder 1108 (FIG. 11) determines the position of the leading 1 in the mantissa portion of operand A. If the special number signal SPC indicates that operand A is an fp16 denorm, shift control circuit 1110 generates an LshAmt signal based on the position of the leading 1; otherwise, shift control circuit 1110 generates an LshAmt signal corresponding to a zero shift. Left shift circuit 1112 applies the specified shift to the mantissa R5, thereby generating a normalized mantissa R6. Exponent decrement block 432 (FIG. 4) decrements the exponent EFE2 by a corresponding amount.

Stage 7 is used to handle cases where the input is fp16 INF or NaN. Specifically, if the special number signal SPC indicates such a value, final result selection logic 1214 (FIG. 12) selects a canonical fp32 INF or NaN value as appropriate. In addition, since $2^N$ scaling may cause the exponent to saturate, saturation logic 1216 is advantageously also used to detect such saturation and cause selection of an appropriate special number (e.g., INF) as the final result.

Direct conversion from fb32 to fp16 involves reducing the exponent from eight bits to five and the significand from 23 bits to 10. The significand may be rounded or truncated as desired. This rounding leverages alignment unit 420 of stage 4 (FIG. 9) and rounding logic 1008 of stage 5 (FIG. 10). The mantissa portion of operand A (preferably including an explicit leading 1) is passed through to the output of stage 3 (result R3a) as described above in Section II.J.

In stage 1, the exponent portion Ea of operand A is passed through exponent product block 424; $2^N$ scaling may be applied by adding the exponent portion Eb of operand B as described above. The result Eab is propagated on path 431.

In stage 2, exponent sum block 426 rebiases the exponent to the fp16 bias, e.g., by using difference circuit 714 (FIG. 7B) to subtract 112, and provides the result as the effective final exponent EFE. In other embodiments, rebiasing may also be performed using bias β and adder 624 of exponent product block 424 (FIG. 6B). Exponent sum block 426 advantageously also detects fp16 exponent overflows (INF or NaN) and underflows (denorms). For overflows, the exponent is clamped to its maximum value. For underflows, exponent sum block 426 sets the difference Ediff to indicate the amount of underflow (e.g., 112−Eab) and sets the effective final exponent EFE to zero (the minimum exponent). For cases other than underflows, the difference Ediff can be set to zero.

In stage 3, Rshift count circuit 428 uses the Ediff signal to determine the right-shift amount to be applied and generates a suitable RshAmt signal. For fp32 to fp16 conversions, the default shift is by 13 bits (so that the 11 LSBs of the result R4a carry the fp16 mantissa). The difference Ediff is added to this default value so that fp16 denorms can be right-shifted by up to 24 bits. A shift of more than 24 bits results in an fp16 zero; accordingly, Rshift count circuit 804 may clamp the shift amount to 24 bits for this operation.

In stage 4, swap mux 904 (FIG. 9) directs the mantissa of operand A onto small operand path 908. On large operand path 910, result R4b is zeroed out by conditional zero unit 920. On small operand path 908, right shift circuit 912 right-shifts the mantissa in accordance with the RshAmt signal, and sticky bit logic 914 advantageously generates sticky bits SB4.

In stage 5, result R4a (the mantissa of operand A) is added to R4b (zero) by plus−1 adder 1002 (FIG. 10). Rounding logic 1008 receives the sticky bits SB4 and selects between the Sum and Sum+1 outputs according to the desired rounding mode; as with other operations, any IEEE rounding made may be selected. The result R5a selected by rounding logic 1008 is propagated onto path 1011.

In stage 6, normalization block 423 passes the result R5 through without modification.

In stage 7, format block 1210 (FIG. 12) formats the fp16 result using the final exponent E0 and the mantissa R6. Exponent saturation logic 1216 detects fp16 exponent overflows, and final result selection logic 1214 responds to such overflows by overriding the result with an fp16 INF. In addition, fp32 INF or NaN inputs, detected by special number detection block 438 in stage 1, can cause an fp16 INF or NaN to be the output.

F2F integer rounding operations are implemented for cases where the input format and the output format are the same (fp32 to fp32 or fp16 to fp16). Integer rounding eliminates the fractional part of the number represented by the operand, and rounding may use any of the standard IEEE rounding modes (ceiling, floor, truncation, and nearest). As with fp32 to fp16 conversions, MMAD unit 220 leverages right-shift circuit 912 of stage 4 and rounding logic 1008 of stage 5 to support integer rounding. Scaling by $2^N$ may be combined with this operation.

The mantissa of operand A is passed through to the output of stage 3 (result R3a) as described in Section II.J above. To support integer rounding, the exponent logic in stages 1 and 2 is used to determine the location of the binary point. In stage 1, in addition to applying any $2^N$ scaling, exponent product block 424 (see FIG. 6B) also subtracts a bias β (e.g., 127 for fp32 or 15 for fp16) and supplies the result as Eab.

If the result Eab is less than zero, then the number is a pure fraction. In stage 2, exponent sum block 426 supplies the result Eab to paths 725 (as signal Ediff) and 723 (as signal EFE).

In stage 3, Rshift count circuit 428 determines the right-shift amount RshAmt based on the signal Ediff. The shift amount is advantageously selected such that for the shifted mantissa, the true binary point is just to the right of the LSB. For instance, for an fp32 input, the shift amount would be (23−Eab) bits for Eab≦23 and zero bits for Eab>23. Rshift count circuit 428 computes this amount and provides an appropriate RshAmt signal to alignment block 420.

In stage 4, small swap mux 904 (FIG. 9) directs operand A onto small operand path 908; on large operand path 910, conditional zero circuit 920 zeroes out result R4b. In small operand path 908, right shift circuit 912 performs the right shift in accordance with the RshAmt signal, and sticky bit logic 914 generates sticky bits SB4.

In stage 5, plu−1 adder 1002 (FIG. 10) adds results R4a (the mantissa of operand A) and R4b (zero), and rounding logic 1008 selects between the Sum and Sum+1 results based on the rounding mode and the sticky bits on path 504.

In stage 6, the result R5 is renormalized back to the input format. Priority encoder 1108 (FIG. 11) detects the position of the leading 1, and shift control circuit 1110 generates a corresponding LshAmt signal that instructs left shift circuit 1112 to shift the mantissa left by the appropriate number of bits, inserting trailing zeroes. Exponent decrement block 432 (FIG. 4) is advantageously configured to ignore the LshAmt signal and provide the exponent EFE2 without modification as final exponent E0.

In stage 7, the result is formatted and propagated as the output. Exponent saturation logic 1216 is advantageously operated as $2^N$ scaling may lead to saturation. Special number inputs (e.g., INF or NaN) may be detected and corresponding special-number results returned as discussed above.

2. Floating-Point to Integer Conversions (F2I)

Floating-point to integer (F2I) conversions are implemented in MMAD unit 220 similarly to the integer rounding F2F conversions described above. The floating-point number to be converted is supplied to MMAD unit 220 as operand A in fp16 or fp32 format. Scaling by $2^N$ can be implemented by supplying the scaling parameter N in the exponent bits of an fp32 operand B as described above. In one embodiment, the target integer format can be 16 or 32 bits, signed or unsigned, with the target format being specified via the opcode.

In stage 0, if operand A is in fp16 format, up-converter 512 (FIG. 5) promotes it to fp32 format as described above. Absolute value and negation can also be applied at this stage. For absolute value, the sign bit is set to positive. For negation, the sign bit is flipped. If, after applicable negation, the sign bit is negative and a signed integer representation is requested, the mantissa portion is inverted by conditional inverter 518 and a sign control signal (not shown in FIG. 4) requesting a negative result is also propagated.

Stages 1–4 proceed as described above for F2F integer rounding conversions, with Rshift control circuit 428 of stage 3 generating a shift amount RshAmt that will place the binary point just to the right of the LSB when the mantissa is right-shifted and right shift circuit 912 (FIG. 9) of stage 4 being used to apply the shift. Sticky bit logic 914 may generate sticky bits SB4.

In stage 5, plus−1 adder 1002 (FIG. 10) adds results R4a (the mantissa of operand A) and R4b (zero), generating Sum and Sum+1 outputs. Rounding logic 1008 selects between them based on the applicable rounding mode and, for signed integer formats, whether the sign control signal from stage 0 indicates a negative result so that a proper twos-complement representation is obtained.

In stage 6, the right-shifted mantissa R5 is passed through without modification.

In stage 7, exponent saturation logic 1216 (FIG. 12) determines whether the input floating-point value exceeds the maximum value in the target integer format. If so, then the result can be clamped to the maximum value (e.g., all bits set to 1) by final result selection logic 1214. Where the input operand was INF, the output may be clamped to the maximum integer value; similarly, where the input operand was a NaN, the output may also be clamped to a desired value, e.g., zero. The properly formatted integer is delivered as the final result OUT. For integer formats with fewer than 32 bits, the results may be right-aligned or left-aligned within the 32-bit field as desired.

3. Integer to Floating-Point Conversions (I2F)

In one embodiment, integer to floating-point (I2F) conversion operations are supported for converting any signed or unsigned integer format to fp32, and for converting eight-bit and sixteen-bit signed or unsigned formats to fp16. As with other conversions, optional negation, absolute value, and $2^N$ scaling are supported. Operand A is provided to MMAD unit 220 in an integer format, and scaling parameter N can be provided in the exponent bits of a floating-point operand B as described above.

In stage 0, operand A is up-converted to 32 bits if necessary by up-converters 504, 508 (FIG. 5). The up-conversion can use sign extension or zero extension. If operand A is negative, it is inverted by conditional inverter 518, and a sign control signal is propagated indicating whether A was inverted. This signal can be used to set the sign bit of the floating-point result. (If absolute value is requested, the sign bit is always set to its positive state.)

The exponent for the floating point number is initialized to correspond to $2^{31}$, then adjusted downward based on the actual position of the leading 1 in the integer. For the mantissa, the 32 bits of the integer are right-shifted to the extent necessary to fit the integer into the floating-point mantissa field (24 bits in the case of fp32, 11 bits in the case of fp16). Specifically, right-shifting is performed during conversion from a 32-bit integer to fp32 in cases where any of the eight MSBs of the integer is nonzero and during conversion from 16-bit integers to fp16 in cases where any of the five MSBs of the integer is nonzero. Where right-shifting occurs, the floating-point result may be rounded using any IEEE rounding mode.

More specifically, in stage 1, I2F byte circuit 444 extracts the eight MSBs from operand A, based on the input format. For 32-bit integer inputs, the eight MSBs of the 32-bit field are extracted; for 16-bit integer formats which are right-aligned in the 32-bit field, the first sixteen bits of the 32-bit field are dropped, and the next eight MSBs are extracted. For 8-bit integers, the last eight bits may be extracted; however, as will become apparent, the result of I2F byte circuit 444 is not used for 8-bit integer inputs. As described above, I2F byte circuit 444 also includes an AND tree that tests whether the remaining bits are all 1; the result of this test (signal And24) is propagated on path 437. In parallel, exponent product block 424 sets the signal Eab to 31 plus the appropriate bias for fp16 (15) or fp32 (127). Where $2^N$ scaling is used, exponent product block 424 also adds the scaling parameter N as described above.

In stage 2, priority encoder 718 of exponent sum block 426 (FIG. 7B) determines the position of the leading 1 within the MSBs of operand A. Difference circuit 714 selects the priority encoder result as the exponent difference Ediff and the exponent Eab as the effective final exponent EFE. In some embodiments, difference circuit 714 uses the signal And24 to determine whether adding 1 to the operand to resolve a twos complement will result in a nonzero bit among the eight MSBs and adjusts the priority encoder result accordingly. Similar logic may also be incorporated into priority encoder 718. Operand A is bypassed to the output of multiplier block 414 (result R2a) as described above in Section II.J.

In stage 3, if operand A was inverted in stage 0 (which can be determined from the sign control signal described above), operand B is forced to 1 using mux 812 (FIG. 8A) and added to operand A by IP adder 804 to complete a twos complement inversion. Otherwise, operand A is bypassed to path 421. Thus, the result R3a is guaranteed positive as desired for the mantissa in fp16 or fp32 formats.

Also in stage 3, Rshift count circuit 428 uses the signal Ediff to determine whether the mantissa should be right-shifted and if so, the shift amount. Right-shifting is advantageously used if the number of bits needed to represent the integer (excluding leading zeroes) exceeds the number of significand bits in the floating-point format. For example, during conversion from 32-bit integer formats to fp32, the mantissa should be right-shifted if the leading 1 is in any of the 1st through 8th bit positions; during conversion from 16-bit integer formats to fp16, the mantissa should be right-shifted if the leading 1 is in any of the 1st through 5th bit positions. As indicated above, the signal Ediff, which comes from priority encoder 718, reflects this information, and Rshift count circuit 428 generates the appropriate signal RshAmt.

In stage 4, small swap mux 904 (FIG. 9) directs the mantissa (result R3a) onto small operand path 908. Right shift circuit 912 right-shifts the mantissa in accordance with the RshAmt signal. Sticky bit logic 908 generates sticky bits SB4. On large operand path 910, conditional zero circuit 920 zeroes out result R4b.

In stage 5, plus–1 adder 1002 (FIG. 10) adds results R4a (the mantissa) and R4b (zero), and rounding logic 1008 selects between the Sum and Sum+1 outputs based on the rounding mode and the sticky bits SB4.

In stage 6, the mantissa R5 is normalized to a floating-point representation. Normalization block 423 left-shifts the mantissa to place the leading 1 in the MSB position, and exponent decrement block 432 adjusts the exponent E0 downward correspondingly.

In stage 7, the mantissa R6 and exponent E0 are formatted as an fp32 or fp16 number by format block 1210 (FIG. 12) and presented to the final selection mux 1212. Saturation logic 1216 may be active, and saturation can occur in some cases, e.g., conversion from u16 to fp16. Where saturation occurs, an overflow value (e.g., INF) in the appropriate floating-point format may be selected.

It should be noted that I2F conversion from a 32-bit integer to fp16 is not supported in this embodiment because priority encoder 718 (FIG. 7B) is an eight-bit encoder. Those of ordinary skill in the art will recognize that the size of the priority encoder is a matter of design choice and that this conversion could be supported by providing a larger priority encoder (e.g., 21 bits).

In another embodiment, priority encoder 718 might be moved to a point in the pipeline after the twos-complement inversion has been performed (e.g., after IP adder 804). In this case, an AND tree would not be needed to detect the effect of a plus–1 operation.

4. Integer to Integer (I2I) Conversions

Integer-to-integer (I2I) conversion operations are supported for converting any integer format to any other integer format, including signed formats to unsigned formats and vice versa. Negation (twos complement) and absolute value options are supported.

In this embodiment, the following rules apply for handling overflows in I2I conversions. First, for conversion from a signed format to an unsigned format, all negative values are clamped to zero. Second, for conversion from a larger format (i.e., a format with more bits) to a smaller format (i.e., a format with fewer bits), overflows are clamped to the maximum allowed value in the smaller format. Third, for conversion from a smaller format to a larger unsigned format, positive values are zero-extended; for conversion to larger signed formats, sign extension is used.

In stage 0, operand A is received. If the input format is smaller than 32 bits, operand A is up-converted to 32 bits (see FIG. 5) using sign extension (or zero extension for unsigned input formats). Operand A is then passed through to the output of stage 3 (result R3a) as described in Section II.J above. In stage 4, small swap mux 904 (FIG. 9) directs operand A onto small operand path 908; on large operand path 910, conditional zero circuit 920 zeroes out result R4b. In small operand path 908, conditional inverter 918 inverts operand A or not based on whether negation or absolute value was requested and, in the case of absolute value, whether operand A is positive or negative.

In stage 5, plus–1 adder 1002 (FIG. 10) adds R4a (operand A) and R4b (zero). If operand A was inverted in stage 4, the Sum+1 output is selected, so that the result is in twos complement form. The result R5 passes through stage 6 without modification.

In stage 7, the output is formatted in formatting block 1210 (FIG. 12). For conversion to a larger signed format, formatting block 1210 advantageously applies sign extension. Formatting block 1210 also clamps the result to the maximum allowed integer for a given format; e.g., for positive numbers, if there are 1s to the left of the MSB position of the target format, then the output is set to all 1s.

5. Fraction (FRC) Operation

The fraction (FRC) operation returns the fractional portion of a floating-point (e.g., fp32) operand A. During an FRC operation, MMAD unit 320 uses the exponent portion of operand A to determine the location of the binary point within the mantissa of operand A and applies a mask that sets all bits to the left of the binary point (integer bits) to zero and preserves the bits to the right of the binary point (fraction bits).

In stage 0, a floating-point (e.g., fp16 or fp32) operand A is received and may be up-converted to fp32 if desired. Operand C is input as (or may be forced to) a field of all zeroes. Operand A is passed through to the output of stage 3 (result R3a) as described in Section II.J above.

In stage 1, while operand A is being passed through, conditional inverter 635 (FIG. 6C) in bitwise logic block 434 inverts operand C to obtain a field of all 1s, and selection mux 636 selects this field as result R1. In other embodiments, selection mux 636 or another circuit may be used to select a field of all 1s, e.g., from an appropriate register (not shown). The result R1 (a field of all 1s) is passed through to the output of stage 3 (result R3b) as described in Section II.J above.

Also in stage 1, exponent product block 424 subtracts the exponent bias (e.g., 127 for fp32 operands) from the exponent portion Ea of operand A and forwards this value as exponent Eab. In stage 2, exponent sum block 426 provides Eab as the exponent difference Ediff and as the effective final exponent EFE.

In stage 3, Rshift count circuit 428 generates a shift signal RshAmt based on the unbiased exponent of A (Eab) and appropriate SwapCtl signals for directing results R3a and R3b onto the large and small operand paths respectively.

In stage 4, large swap mux 906 (FIG. 9) directs operand A (result R3a) onto large operand path 910 and small swap mux 904 directs the field of 1s (result R3b) onto small operand path 908. Right shift circuit 912 forms a mask by right-shifting the field of 1s in response to the RshAmt signal; a logical right shift is advantageously used. The mask is passed through conditional inverter 918 as result R4a on path 909. It should be noted if the unbiased exponent of operand A is zero or negative, then the RshAmt signal advantageously corresponds to a zero shift. For positive exponents, a non-zero shift is appropriate, and the shift may be limited, e.g., to 24 bits.

Large operand path 910 passes operand A through unmodified as result R4b on path 911. In parallel, exponent increment block 430 (FIG. 4) passes through the effective final exponent EFE without modification as EFE2.

In stage 5, AND2 circuit 1004 (FIG. 10) operates to apply the mask R4a to operand A (received as R4b). The mask zeroes out integer bits of operand A and has no effect on fractional bits. Selection mux 1010 selects the output from AND2 circuit 1004, which is the fractional bits of A.

In stage 6, normalization block 423 priority encodes and normalizes the result R5, and exponent decrement block 432 makes a corresponding adjustment to the effective final exponent EFE2 to obtain the final exponent E0.

In stage 7, the result R6 including exponent E0 is formatted as an fp32 (or fp16) number by format block 1210 (FIG. 12) and presented to the final selection mux 1212 for selection. Special number logic may be used if desired to override the computed result in the case where operand A is INF or NaN.

E. Domain Mapping (RRO)

Domain mapping operations, also called argument reduction or range reduction operations (RROs), are also implemented in MMAD unit 220. These operations support computation of various transcendental functions in a separate arithmetic unit that may be implemented e.g., as one of the other functional units 222 of FIG. 2. In one embodiment, MMAD unit 220 performs domain mapping operations that reduce the floating-point arguments x of trigonometric functions (e.g., sin(x) and cos(x)) and exponential functions ($2^x$) to a bounded range. Thus, for RRO the input to MMAD unit 220 is an fp32 number x, provided as operand A. The output is in a special 32-bit format as described below.

1. RRO for Trigonometric Functions

Functional units that compute sin(x) and cos(x) generally exploit the periodicity of these functions by requiring that the argument x first be reduced to $2\pi K+x_0$, where K is an integer and $0 \leq x_0 < 2\pi$. The trigonometric function can then be computed using $x_0$. In some implementations, $x_0$ is specified as a fraction $x_R = x_0/2\pi$, where $0 \leq x_R < 1$.

In one embodiment of the present invention, MMAD unit 220 computes $x_R$ for a trigonometric RRO by leveraging the multiplication stages of the MAD pipeline (stages 1–3 in FIG. 4) to execute a floating-point multiplication by $1/2\pi$ and the remaining stages to extract the fractional portion of the result. Due to the finite numerical precision of the multiplication, the result is an approximation, but the approximation is adequate for applications (e.g., graphics) where very large values of x generally do not occur.

The output of the trigonometric RRO is provided in a special 32-bit fixed-point format that includes a sign bit, a one-bit special number flag, five reserved bits and 25 fraction bits. Where the special number flag is set to logical true, the result is a special number, and some or all of the reserved or fraction bits may be used to indicate which special number (e.g., INF or NaN).

In stage 0, argument x is provided as operand $A_0$ in fp32 format and passed through as operand A.

In stage 1, exponent product block 424 passes through the exponent portion Ea of operand A as exponent Eab. In premultiplier circuit 416, multiplexer 616 (FIG. 6A) selects the stored Booth3 encoded representation of $\frac{1}{2}\pi$ from register 618 as the multiplier on path BB.

In stage 2, exponent sum block 426 selects exponent Ea as the effective final exponent EFE and difference Ediff. Multiplier block 614 computes $A*(\frac{1}{2}\pi)$ and provides sum and carry fields for the product as results R2a and R2b.

In stage 3, Rshift count circuit 428 determines from the signal Ediff whether a right shift should be performed to properly align the binary point for the fixed-point result. For example, a right shift may be needed if the exponent is negative. If a right shift is needed, Rshift count circuit 428 provides the appropriate shift amount signal RshAmt. Also in stage 3, IP adder 804 (FIG. 8A) adds the sum and carry fields (R2a, R2b) to generate the product. The upper 32 bits are selected as result R3a by mux 814. Sticky bit logic 808 may generate sticky bits SB3 for later use in rounding.

In stage 4, exponent increment block 430 may adjust the exponent if needed to reflect carries in IP adder 804, as is done during FMUL and FMAD operations described above. In alignment unit 420, small swap mux 904 (FIG. 9) directs the product R3a onto small operand path 908, where any right shift determined by Rshift count circuit 428 is applied by right shift circuit 912. The result R4a is propagated to path 909. If a right shift is applied, sticky bit logic 914 may generate new sticky bits SB4; otherwise, sticky bit logic 914 may forward sticky bits SB3 as sticky bits SB4. In large operand path 910, conditional zero unit 920 zeroes out result R4b.

In stage 5, plus-1 adder 1002 (FIG. 10) adds results R4a (the product) and R4b (zero). In some embodiments, rounding logic 1008 is not used; in other embodiments, rounding logic 1008 may operate on the sticky bits from path SB4. (Since the RRO is approximate, rounding does not necessarily improve the accuracy of the result.)

In stage 6, normalization block 423 applies a left shift if needed to properly locate the binary point (e.g., if the exponent is positive). The effective final exponent on path EFE2 is used by shift control circuit 1110 to determine the left shift amount, and the shift is performed by left shift circuit 1112. This shifted result R6 is provided on path 425. Exponent decrement block 432 may correspondingly decrement the final exponent E0 if desired, although the exponent will be ignored in stage 7.

In stage 7, the sign bit and 25 bits from the result on path R6 are used by format block 1210 (FIG. 12) to generate the final 32-bit result Rdata in the format described above. The special number flag in the result Rdata is advantageously set in response to the special number signal SPC from special number detection block 439 in stage 1; where a special number is detected, some of the fraction bits or reserved bits can be used to indicate which special number.

2. RRO for Exponential Function EX2

As is known in the art, the base-2 exponential function ($EX2(x)=2^x$) can be implemented in an arithmetic functional unit by decomposing $x=M+f$, where M is an integer and f is in the interval [0.0, 1.0), then computing $2^M*2^f$. Computing $2^M$ is trivial (bit shifting or exponent addition), and computing $2^f$ can done using lookup tables.

In one embodiment, MMAD unit 220 performs an RRO for the EX2 function by extracting the fractional part of the argument x. This RRO is somewhat similar to the integer rounding operation described above in the context of F2F conversions, but in this case bits to the right of the binary point are preserved.

The output of the exponential RRO is in a special 32-bit format with a sign bit, a one-bit special number flag, seven integer bits and 23 fraction bits. Where the special number flag is set to logical true, the result is a special number, and some or all of the integer or fraction bits may be used to indicate which special number.

In stage 0, the argument x is provided to MMAD unit as operand $A_0$ in fp32 format and passed through as operand A.

In stage 1, exponent product block 424 subtracts 127 (the fp32 bias) from exponent Ea, generating the result Eab. As described below, result Eab will be used in subsequent stages to align the binary point so that there are 23 bits to the right of it and 7 bits to the left. In premultiplier circuit 416 (see FIG. 6A), a Booth3 encoded representation of 1.0 from register 620 is selected by mux 616.

In stage 2, exponent sum block 426 passes through Eab as an effective final exponent EFE and difference Ediff. Multiplier block 414 multiplies operand A by 1.0 and provides the sum and carry fields for the product as results R2a and R2b.

In stage 3, Rshift count circuit 428 determines from difference signal Ediff whether a right shift is needed to align the binary point; e.g., based on whether Ediff is negative or positive. If a right shift is needed, Rshift count circuit 428 generates the RshAmt signal to reflect the shift amount, which is determined from the magnitude of Ediff. Also in stage 3, IP adder 804 (FIG. 8A) adds the sum and carry fields R2a and R2b to generate the product, and mux 814 selects the upper 32 bits as result R3a. Sticky bit logic 808 may generate sticky bits SB3.

In stage 4, exponent increment block 430 adjusts the exponent to reflect any carries by IP adder 804. In alignment unit 420, small swap mux 904 (FIG. 9) directs the product result R3a onto small operand path 908, where any right shift determined by Rshift count circuit 804 is applied by right shift circuit 912, thereby generating result R4a. If a right shift is applied, sticky bit logic 914 may generate new sticky bits SB4 based on the right shift amount; otherwise, sticky bits SB3 may be propagated as sticky bits SB4. In large operand path 910, conditional zero unit 920 zeroes out result R4b.

In stage 5, plus-1 adder 1002 (FIG. 10) adds results R4a (the product A*1) and R4b (zero). In some embodiments, rounding logic 1008 selects the Sum output as result R5; in other embodiments, rounding logic 1008 may use sticky bits SB4 to select between Sum and Sum+1 outputs.

In stage 6, normalization block 423 applies a left shift (if needed) to properly align the binary point (e.g., if the exponent is positive). The effective final exponent EFE2 is used by shift control circuit 1110 to determine the left shift amount, and the shift is performed by left shift circuit 1112. This shifted result R6 is provided on path 425. Exponent decrement block 432 may correspondingly decrement the exponent if desired.

In stage 7, format block 1210 (FIG. 12) converts the result R6 to a fixed-point representation with seven integer bits and 23 fraction bits. Exponent saturation logic 1216 may be used to detect saturation, in which case INF (in the special output format described above) may be selected as the result.

IV. Further Embodiments

While the invention has been described with respect to specific embodiments, one skilled in the art will recognize that numerous modifications are possible. For instance, an MMAD unit may be implemented to support more, fewer, or different functions in combination and to support operands and results in any format or combinations of formats.

The various bypass paths and pass-throughs described herein may also be varied. In general, where a bypass path around any circuit block is described, that path may be replaced by an identity operation (i.e., an operation with no effect on its operand, such as adding zero) in that block and vice versa. A circuit block is bypassed during a given operation may be placed into an idle state (e.g., a reduced power state) or operated normally with its result being ignored by downstream blocks, e.g., through operation of selection muxes or other circuits.

The division of the MMAD pipeline into stages is arbitrary. The pipeline may include any number of stages, and the combination of components at each stage may be varied as desired. Functionality ascribed to particular blocks herein may also be separated across pipeline stages; for instance, a multiplier tree might occupy multiple stages.

The functionality of various blocks may also be modified. In some embodiments, for example, different adder circuits or multiplier circuits may be used, and use of Booth3 encoding (or any other encoding) for multiplication is not required.

In addition, the MMAD unit has been described in terms of circuit blocks to facilitate understanding; those skilled in the art will recognize that the blocks may be implemented using a variety of circuit components and layouts and that blocks described herein are not limited to a particular set of components or physical layout. Blocks may be physically combined or separated as desired.

A processor may include one or more MMAD units in an execution core. For example, where superscalar instruction issue (i.e., issuing more than one instruction per cycle) is desired, multiple MMAD units may be implemented, and different MMAD units may support different combinations of functions. A processor may also include multiple execution cores, and each core may have its own MMAD unit(s).

Further, while the invention has been described with reference to a graphics processor, those skilled in the art will appreciate that the present invention may also be employed in other processors such as math co-processors, vector processors, or general-purpose processors.

Thus, although the invention has been described with respect to specific embodiments, it will be appreciated that the invention is intended to cover all modifications and equivalents within the scope of the following claims.

What is claimed is:

1. A multipurpose functional unit for a processor, comprising:
   an input section configured to receive first, second, and third operands and an opcode designating one of a plurality of supported operations to be performed and further configured to generate a plurality of control signals in response to the opcode;
   a multiplication pipeline coupled to the input section and configurable in response to the control signals to compute a product of the first and second operands and to select the computed product as a first intermediate result;
   a test pipeline coupled to the input section and configurable in response to the control signals to perform a comparison on one or more of the first, second, and third operands and to select a result of the comparison as a second intermediate result;
   an addition pipeline coupled to the multiplication section and the test pipeline and configurable in response to the control signals to compute a sum of the first and second intermediate results and to select the computed sum as an operation result;
   an exponent pipeline coupled to the input section and configurable in response to the control signals to perform an exponent computation on one or more of the first, second, and third operands and to select a result of the exponent computation as an exponent result; and
   an output section coupled to receive the operation result and the exponent result and configurable in response to the control signals to generate a final result for the one of the supported operations designated by the opcode,
   wherein the plurality of supported operations includes a floating-point multiply-add (FMAD) operation, an integer multiply-add (IMAD) operation, and at least one comparison test operation.

2. The multipurpose functional unit of claim 1, wherein the addition pipeline is further configurable in response to the control signals such that the first intermediate result is replaced with a zero value prior to adding the first and second intermediate results in the event that the opcode designates the comparison test operation.

3. The multipurpose functional unit of claim 1, wherein the at least one comparison test operation includes one or more operations selected from a group consisting of a maximum (MAX) operation, a minimum (MIN) operation, and a ternary comparison (CMP) operation.

4. The multipurpose functional unit of claim 3, wherein the at least one comparison test operation includes the MAX operation, the MIN operation, and the CMP operation, and wherein the test pipeline is further configurable in response to the control signals such that:
   in the event that the opcode designates the MAX operation, the second intermediate result corresponds to the larger of the first operand and the second operand;
   in the event that the opcode designates the MIN operation, the second intermediate result corresponds to the smaller of the first operand and the second operand; and
   in the event that the opcode designates the CMP operation, the second intermediate result corresponds to the second operand when the third operand is less than zero and to the first operand otherwise.

5. The multipurpose functional unit of claim 1, wherein the at least one comparison test operation includes one or more binary test (SET) operations selected from a group consisting of a greater than operation, a less than operation, an equality operation, and an unordered operation, wherein each of the one or more binary test operations produces a Boolean result.

6. The multipurpose functional unit of claim 5, further comprising:
   an auxiliary result path coupled between the test pipeline and the output section and configured to deliver a Boolean auxiliary result from the test pipeline to the output section,
   wherein the output section is further configurable in response to the control signals to generate the final result based on the Boolean auxiliary result in the event that the opcode designates one of the SET operations.

7. The multipurpose functional unit of claim 1, wherein the plurality of supported operations further includes a bitwise Boolean logic operation.

8. The multipurpose functional unit of claim 7, wherein the bitwise Boolean logic operation is selectable from a group consisting of an AND operation, an OR operation and an XOR operation, and wherein the test pipeline includes:
   an AND circuit configured to generate a bitwise logical AND of the first and second operands as a first output;
   an OR circuit configured to generate a bitwise logical OR of the first and second operands as a second output;
   an XOR circuit configured to generate a bitwise logical XOR of the first and second operands as a third output; and
   a selection circuit configurable in response to the control signals such that, in the event that the opcode designates one of the AND, OR and XOR operations, the second intermediate result is a corresponding one of the first, second and third outputs.

9. The multipurpose functional unit of claim 1, wherein the plurality of supported operations further includes a floating-point addition (FADD) operation and an integer addition (IADD) operation, wherein the addition pipeline is further configurable in response to the control signals to perform the FADD operation and the IADD operation.

10. The multipurpose functional unit of claim 9, wherein the multiplication pipeline is further configurable in response to the control signals such that the first operand is selected as the first intermediate result in the event that the opcode designates the FADD operation or the IADD operation.

11. The multipurpose functional unit of claim 1, wherein the plurality of supported operations further includes a floating-point multiplication (FMUL) operation and an integer multiplication (IMUL) operation, wherein the multiplication pipeline is further configurable in response to the control signals to perform the FMUL operation and the IMUL operation.

12. The multipurpose functional unit of claim 11, wherein the addition pipeline is further configurable in response to the control signals such that the second intermediate result is replaced with a zero value prior to adding the first and second intermediate results in the event that the opcode designates the FMUL operation or the IMUL operation.

13. The multipurpose functional unit of claim 1, wherein the plurality of supported operations further includes a format conversion operation that converts the first operand from an input format to a target format.

14. The multipurpose functional unit of claim 13, wherein the input format is a floating-point format and the target format is an integer format.

15. The multipurpose functional unit of claim 13, wherein the input format is an integer format and the target format is a floating-point format.

16. The multipurpose functional unit of claim 1, wherein the plurality of supported operations further includes a domain mapping (RRO) operation.

17. The multipurpose functional unit of claim 16, wherein the RRO operation reduces the first operand for use in computing a trigonometric function.

18. The multipurpose functional unit of claim 16, wherein the RRO operation reduces the first operand for use in computing an exponential function.

19. The multipurpose functional unit of claim 1, wherein the plurality of supported operations further includes a fraction (FRC) operation that returns a fractional portion of the first operand.

20. The multipurpose functional unit of claim 1, wherein the addition pipeline includes:
   an alignment circuit configurable in response to the control signals to right-shift one of the first and second intermediate results based on an alignment signal from the exponent pipeline in the event that the opcode designates the FMAD operation; and
   a normalization circuit configurable in response to the control signals to left-shift the sum of the first and second intermediate results in the event that the opcode designates the FMAD operation.

21. The multipurpose functional unit of claim 20, wherein the plurality of supported operations further includes a left-shift (SHL) operation and a right-shift (SHR) operation that shift the first operand left and right, respectively, and wherein:
   in the event that the opcode designates the SHL operation, the normalization circuit applies the left shift; and
   in the event that the opcode designates the SHR operation, the alignment circuit applies the right shift.

22. A microprocessor comprising:
   an execution core including a plurality of functional units configured to execute program operations,
   wherein the plurality of functional units includes a multipurpose functional unit capable of executing a plurality of operations including at least a floating-point multiply-add (FMAD) operation, an integer multiply-add (IMAD) operation, and at least one comparison test operation, the multipurpose functional unit including:
      an input section configured to receive first, second, and third operands and an opcode designating one of a plurality of supported operations to be performed and further configured to generate a plurality of control signals in response to the opcode;
      a multiplication pipeline coupled to the input section and configurable, in response to the control signals, to compute a product of the first and second operands and to select the computed product as a first intermediate result;
      a test pipeline coupled to the input section and configurable, in response to the control signals, to perform a comparison on one or more of the first, second, and third operands and to select a result of the comparison as a second intermediate result;
      an addition pipeline coupled to the multiplication section and the test pipeline and configurable, in response to the control signals, to compute a sum of the first and second intermediate results and to select the computed sum as an operation result;
      an exponent pipeline coupled to the input section and configurable, in response to the control signals, to perform an exponent computation on one or more of the first, second, and third operands and to select a result of the exponent computation as an exponent result; and
      an output section coupled to receive the operation result and the exponent result and configurable, in response to the control signals, to generate a final result for the one of the supported operations designated by the opcode.

23. A method of operating a functional unit of a microprocessor, the method comprising:
   receiving an opcode designating one of a plurality of supported operations to be performed and one or more operands on which the designated operation is to be performed;

in response to the opcode and the one or more operands, operating a multiplication pipeline in the functional unit to generate a first intermediate result;

in response to the opcode and the one or more operands, operating a test pipeline in the functional unit to generate a second intermediate by performing a comparison operation on one or more of the received operands;

in response to the opcode and the one or more operands, operating an exponent pipeline in the functional unit to generate an exponent result and an alignment control signal;

operating an addition pipeline in the functional unit in response to the opcode and the alignment control signal to add the first and second intermediate results and generate an operation result; and operating an output section of the functional unit to compute a final result from the operation result and the exponent result, wherein the plurality of supported operations includes a floating-point multiply-add (FMAD) operation, an integer multiply-add (IMAD) operation, and at least one comparison test operation.

* * * * *

UNITED STATES PATENT AND TRADEMARK OFFICE
CERTIFICATE OF CORRECTION

| | |
|---|---|
| PATENT NO. | : 7,225,323 B2 |
| APPLICATION NO. | : 10/985291 |
| DATED | : May 29, 2007 |
| INVENTOR(S) | : Siu et al. |

It is certified that error appears in the above-identified patent and that said Letters Patent is hereby corrected as shown below:

In claim 1, column 40, line 6, please delete "section" and insert --pipeline--;

In claim 23, column 43, line 6, after "intermediate" please insert --result--.

Signed and Sealed this
Fourth Day of January, 2011

David J. Kappos
*Director of the United States Patent and Trademark Office*